(12) United States Patent
Koike

(10) Patent No.: US 6,801,138 B2
(45) Date of Patent: Oct. 5, 2004

(54) POSITIONAL DATA UTILIZING INTER-VEHICLE COMMUNICATION METHOD AND TRAVELING CONTROL APPARATUS

(75) Inventor: Shin Koike, Aichi-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/198,934

(22) Filed: Jul. 22, 2002

(65) Prior Publication Data

US 2003/0006889 A1 Jan. 9, 2003

Related U.S. Application Data

(62) Division of application No. 09/475,986, filed on Dec. 30, 1999, now Pat. No. 6,445,308.

(30) Foreign Application Priority Data

| Jan. 12, 1999 | (JP) | ............................................ | 11-005415 |
| Jan. 12, 1999 | (JP) | ............................................ | 11-005740 |
| Mar. 26, 1999 | (JP) | ............................................ | 11-083379 |
| Oct. 28, 1999 | (JP) | ............................................ | 11-306433 |

(51) Int. Cl.[7] ................................................ G08G 1/00
(52) U.S. Cl. ....................... 340/902; 180/167; 340/903; 455/517
(58) Field of Search ................................ 340/961, 905, 340/928, 902, 903, 435; 201/117, 24, 301; 455/517; 180/167, 168, 169; 235/384

(56) References Cited

U.S. PATENT DOCUMENTS

| 4,835,537 A | * | 5/1989 | Manion ........................ 342/30 |
| 5,179,377 A | * | 1/1993 | Hancock ..................... 340/961 |
| 5,515,286 A | * | 5/1996 | Simon ......................... 340/961 |
| 5,572,201 A | | 11/1996 | Graham et al. ............. 340/902 |
| 5,572,428 A | | 11/1996 | Ishida et al. ................ 340/903 |
| 5,872,526 A | * | 2/1999 | Tognazzini ................. 340/961 |
| 5,892,462 A | * | 4/1999 | Tran ........................... 340/961 |
| 5,926,465 A | | 7/1999 | Schilling .................... 370/261 |
| 5,953,319 A | | 9/1999 | Dutla et al. ................. 370/401 |
| 5,983,161 A | | 11/1999 | Lemelson et al. .......... 701/301 |
| 6,085,150 A | * | 7/2000 | Henry et al. ................ 701/301 |
| 6,133,867 A | * | 10/2000 | Eberwine et al. ............. 342/29 |
| 6,201,482 B1 | * | 3/2001 | Schiefele et al. ........... 340/961 |
| 6,226,572 B1 | * | 5/2001 | Tojima et al. ................ 701/23 |
| 6,359,553 B1 | | 3/2002 | Kopischke .................. 340/436 |
| 6,405,132 B1 | | 6/2002 | Breed et al. ................ 701/301 |

FOREIGN PATENT DOCUMENTS

| DE | 44 34 789 A1 | 4/1996 |
| EP | 0 493 141 A1 | 7/1992 |
| EP | 0 625 770 A1 | 11/1994 |
| EP | 0 817 152 A1 | 1/1998 |

(List continued on next page.)

OTHER PUBLICATIONS

K. Mizui et al., "Vehicle–to–Vehicle Communications and Ranging System Using Spread Spectrum Techniques", *Electronics and Communications in Japan*, Part 1, vol. 79, No. 12, pp. 106–114, (1996).

Primary Examiner—Brent A. Swarthout
(74) Attorney, Agent, or Firm—Oliff & Berridge, PLC

(57) ABSTRACT

Predicted future positions are calculated (S11) and arranged into packets (S12) to be transmitted using a communication pattern (for example, a PN series) based on a time and a position of each packet (S13). Another vehicle calculates its predicted position (S21) and generates a communication pattern based on a result of calculation (S22) so that the generated communication pattern is utilized for reception (S23). Consequently, data associated with a future position of its own can be selected for enabling reception. An existence probability is calculated, and the state of another vehicle can be accurately understood from the communication of the calculated existence probability, thereby effectively reducing chance of collision.

8 Claims, 33 Drawing Sheets

FOREIGN PATENT DOCUMENTS

| | | |
|---|---|---|
| JP | A-4-299800 | 10/1992 |
| JP | A-5-167525 | 7/1993 |
| JP | A-5-297937 | 11/1993 |
| JP | A-7-262497 | 10/1995 |
| JP | A-7-318632 | 12/1995 |
| JP | A-7-333317 | 12/1995 |
| JP | A-9-287394 | 11/1996 |
| JP | A-9-188234 | 7/1997 |
| JP | A-10-148665 | 6/1998 |
| JP | A-10-162299 | 6/1998 |
| JP | A-10-188199 | 7/1998 |
| JP | 10-322263 | 12/1998 |
| JP | A-2000-242898 | 9/2000 |

\* cited by examiner

POSITIONAL DATA UTILIZING INTER-VEHICLE COMMUNICATION METHOD AND TRAVELING CONTROL APPARATUS

This is a Division of Application Ser. No. 09/475,986, now U.S. Pat. No. 6,445,308, filed Dec. 30, 1999. The entire disclosure of the prior application(s) is hereby incorporated by reference herein in its entirety.

BACKGROUND OF THE INVENTION

1. Field of the Invention

The present invention relates to an apparatus for performing communication with another vehicle having similar positional data based on broadcast positional data. The present invention also relates to an avoidance operation when it is recognized that there is a possibility of a collision with another vehicle.

2. Description of the Related Art

Systems for collecting a variety of information using a vehicle mounted communication apparatus, systems for collecting destination information of each vehicle to be utilized in traffic control, and a variety of other systems have all been proposed.

Inter-vehicle communication has been proposed where a moving or stopping vehicle will notify another vehicle of its actions or of information obtained in communication between the vehicles.

With such inter-vehicle communication, along with useful data, unnecessary information is often transmitted and received. For example, even if information of future traveling/stopping of a vehicle which has brushed is received, it usually has no meaning. Therefore, in inter-vehicle communication, there are many requests to effectively select useful data from all received data.

Furthermore, Japanese patent laid-open publication No. Hei 7-333317 discloses an apparatus that transmits/receives position information between movable bodies and raises an alarm when both movable bodies are approaching a predetermined distance.

Moreover, there has been proposed a system for averting vehicle collision by performing communication between vehicles (inter-vehicle communication) and measuring the distance between the vehicles. The "SS boomerang system" is one such system. In the "SS boomerang system," an electromagnetic wave is broadcast, and a response is returned by vehicles which receive that signal. The response time is measured to calculate the distance between the vehicles to allow the possibility of collision to be reduced.

However, with inter-vehicle communication for measuring the distance between vehicles based on the response time of the transmitted electric wave, accurate motion information of another vehicle other than the distance between the vehicles is difficult to obtain.

In addition, it is not negligible that the avoidance operation carried out by the both vehicles that have possibility of a crash is not necessarily appropriate.

SUMMARY OF THE INVENTION

It is an object of the present invention to provide an inter-vehicle communication apparatus capable of receiving only necessary information in a vehicle by including positional data in a communication protocol.

It is another object of the present invention to provide a vehicular traveling control apparatus for executing control to avert a collision with another vehicle by obtaining accurate motion information of the other vehicle through inter-vehicle communication.

According to one aspect of the present invention, a communication pattern is determined based on the position of the user's vehicle. Therefore, transmission data is received in the vehicle that has received data in accordance with the communication pattern at that position. Thus, a signal required for reception can be automatically selected.

For example present position and projected positions at two seconds later, four seconds later, ..., n seconds later are represented in the form of time data and positional data, and the communication pattern is determined based on these data. As such a communication pattern, the PN series for the spread spectrum or the frequency hopping pattern may be adopted. For example, when the PN series is determined based on the time and position and then transmitted, the inverse spread is performed only in a vehicle using the same PN series to receive signals. In other words, on the receiving side, only signals that coincide with the future time and position of the user's vehicle.

Further, it may be preferable to determine a search range for the communication pattern based on a range related to traveling of the user's vehicle, whereby this vehicle can communicate with another vehicle in that range.

When it is determined that there is a possibility of collision, it may be preferable to select a communication pattern for emergency. This enables identification of the emergency communication from any other communication.

Furthermore, it may be preferable to narrow the search range when another vehicle approaches. This can narrow the search range to select only a specific emergency communication to be performed.

Moreover, according to another aspect of the present invention, existence probability data can be calculated based on the positional data of the user's vehicle and position error data. The accuracy of this existence probability data can be greatly increased by utilizing the position error data.

Use of the existence probability data can allow precise motion information of another vehicle to be obtained to assist carrying out of accurate avoidance control.

Additionally, according to yet another aspect of the present invention, relative position data of the user's vehicle and another vehicle obtained from the inter-vehicle communication is used to generate the existence probability data of the user's vehicle in order to execute avoidance control.

In addition, according to a further aspect of the present invention, the user's vehicle and another vehicle do not perform the uniform avoidance operation even when there is a possibility of a collision. Rather, the operation for averting collision is executed based on the priority of the user's vehicle and of the other vehicle. This can prevent affecting the travel of the other vehicle or the traffic flow while still effectively avoiding collision.

Furthermore, when the user's vehicle travels on a privileged road, it is preferable to suppress the avoidance operation of that vehicle and give priority of the avoidance operation to another vehicle. This enables avoidance of a collision without adversely affecting any other vehicle running on the privileged road.

Moreover, in regard to priority, the difficulty of the avoidance operation and the influence on other traffic also depends on the speeds at which the vehicles are travelling. For example, when the speed of the user's vehicle is lower than that of another vehicle, it is relatively easy to execute an avoidance operation through the user's vehicle. Accordingly, determining the priority based on the vehicle speed can effectively avoid collision.

In addition, avoiding collision with a first vehicle is pointless if this action increase the possibility of a collision with a second vehicle. Taking into account the possibility of collision with the second vehicle when the user's vehicle is performing an avoidance operation, it is preferable to carry out the avoidance operation when there is no possibility of collision with an additional vehicle. This can avoid collisions and help maintain smooth traffic flow.

Additionally, in the inter-vehicle communication, transmission/reception information for determining which vehicle should move to avert a collision can assist in effectively avoiding collision.

Further, even if the user's vehicle takes priority, it is preferable to determine that avoidance operation should not be carried out upon receiving data representative of execution of the avoidance operation from another vehicle. For example, the user's vehicle executes the avoidance operation in principle, even when it takes priority, unless data indicating that another vehicle is performing an avoidance operation is received from that vehicle.

DETAILED DESCRIPTION OF THE PREFERRED EMBODIMENTS

Figure 1:
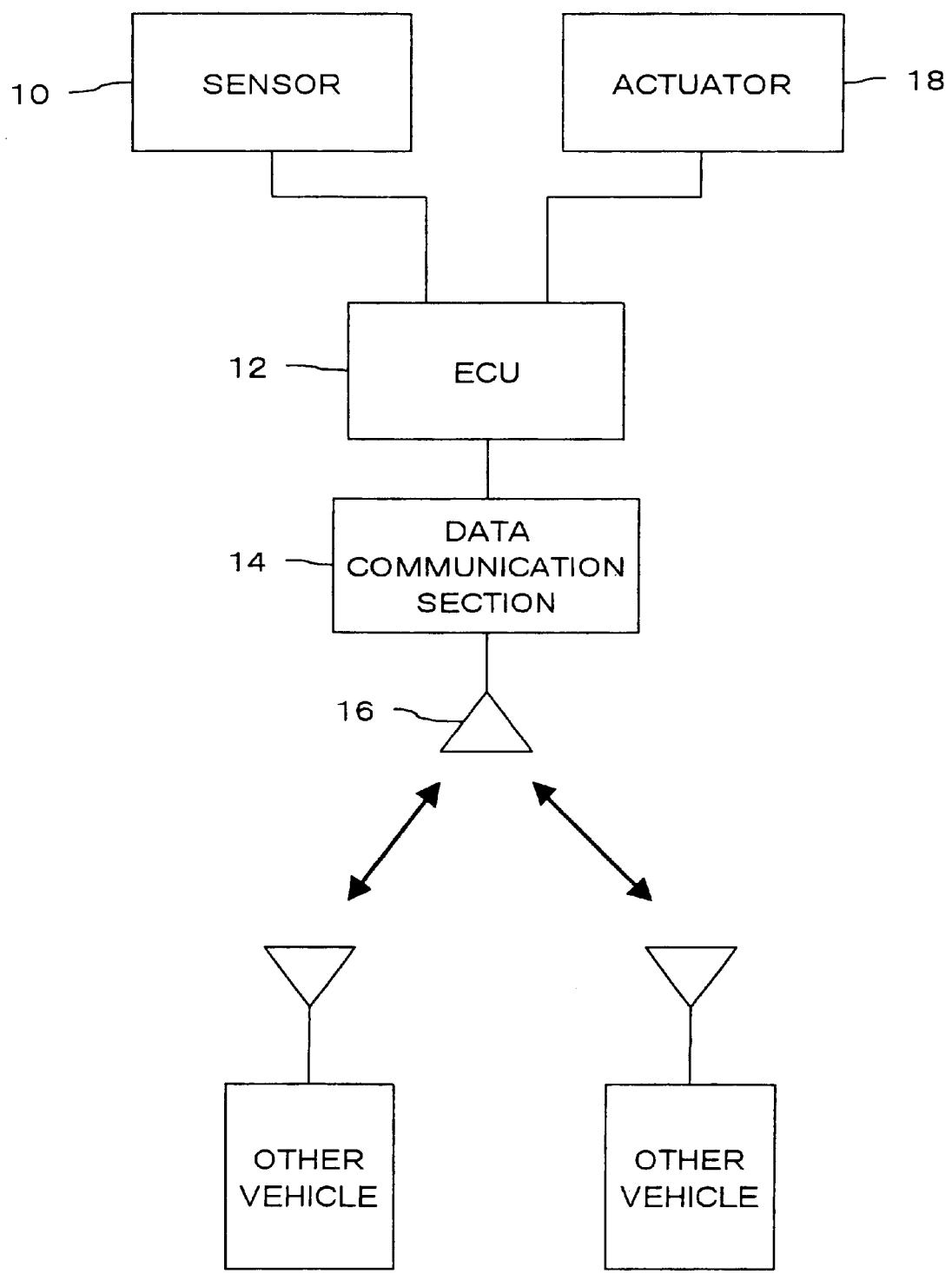
FIG. 1 is a view showing the structure of an apparatus according to the present invention.

Preferred embodiments of the present invention will now be described with reference to the accompanying drawings.
First Embodiment
Structure FIG. 1 is a block diagram showing the system structure according to a first embodiment of the present invention. A detection signal from a sensor 10 such as a GPS, a steering sensor, or a clock is supplied to an ECU 12. Then, a position of the vehicle, time, motion of the vehicle and other information are determined using the supplied detection signal. For example, a prediction value such as a future time and a position is obtained. This data is supplied to a data communication section 14 where a carrier is modulated. Additionally, in this communication section 14, a communication pattern such as a PN series in the spread spectrum communication or a frequency hopping pattern is determined based on the present and future positional data of the user's vehicle, and a transmission signal based on this communication pattern is formed to be transmitted to another vehicle via an antenna 16.

Further, the data from another vehicle received via the antenna 16 is demodulated in accordance with the communication pattern based on the present position and the future position of the user's vehicle in the data communication section 14, and a modulation signal is retrieved so that its content is recognized in the ECU 12.

An actuator 18 for brake, steering, or the like is connected to the ECU 12, and the actuator 18 is driven to operate the brake or steering when it is determined that operation of such a member is necessary as a result of recognition by the ECU 12.

Figure 2:
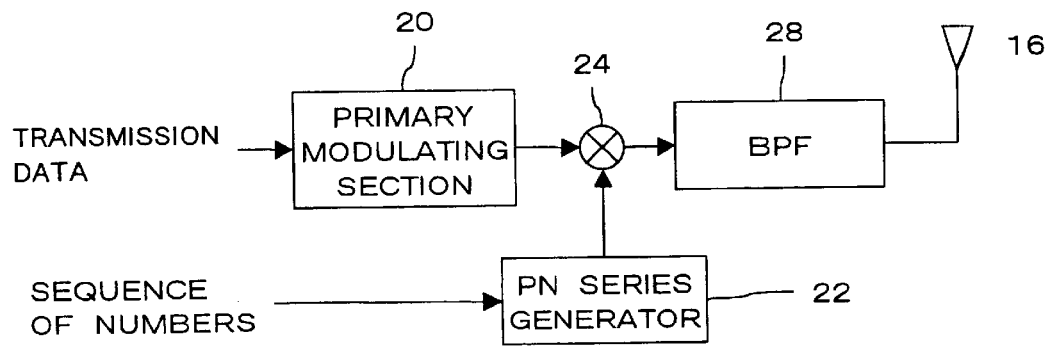
FIG. 2 is a view showing the structure of the data communication section (transmitting side) of the apparatus shown in FIG. 1.

FIG. 2 illustrates the structure of a transmitting side of the data communication section 14. In this example, the PN series based on the position is generated as a communication pattern, and this is used to perform direct spread. The transmission data is mixed with the carrier in a primary modulating section 20, and the carrier is then modulated (primary modulation) with the transmission data. The transmission data may, for example, be positional data from the present to a point in future as estimated at predetermined intervals. Further, this transmission data may, for example, be digital pulse data. A numerical sequence which is generated based on positional data and other data as described below is fed into a PN series generator 22 where the PN series based on the number sequence is generated. This PN series is input to a multiplier 24 to be mixed with a signal subjected to primary modulation, and thereafter a desired spread spectrum is performed. Then, in a BPF (band-pass filter), a signal having a predetermined frequency band is selected to be transmitted from the antenna 16.

Figure 3:
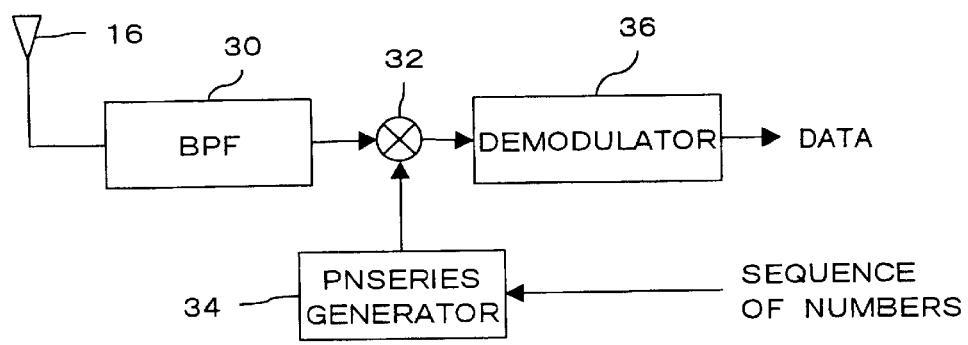
FIG. 3 is a view showing the structure of the data communication section (receiving side) of the apparatus shown in FIG. 1.

Next, FIG. 3 shows the structure of a receiving side of the data communication section 14. A reception signal received via the antenna 16 is selected to a predetermined band in the BPF 30 and thereafter supplied to the multiplier 32. To the multiplier 32 is supplied the PN series from the PN series generator 34, and the inverse spread spectrum is performed with this PN series. It is to be noted that a number sequence generated based on the later-described positional data of the user's vehicle is supplied to the PN series generator 34, and the PN series is generated based on this number sequence. Therefore, the signal subjected to the inverse spread spectrum in the multiplier 32 is supplied to the demodulator 36 where the data can be obtained.

Generation of Communication Pattern

As described above, in this embodiment, although the spread spectrum is performed in accordance with the PN series, generation of the PN series will now be described.

The PN series is generated based on time, positional data, and other information. For example, when the future position based on the present time is as shown in Table 1:

TABLE 1

| Time (seconds later) | Position (coordinate) | Existence Probability |
| --- | --- | --- |
| 1.01 | (1012.6, 104.6, 15.2) | (1.0) |
| 2.20 | (1010.3, 105.2, 15.2) | (0.95) |
| 3.35 | (1008.3, 107.2, 15.2) | (0.88) |

In this case, the time and the positional data are rounded off in a proper unit to be combined so that a series of a number sequence is generated. The processing for rounding off in a proper unit is performed by setting a value to which the LSB of that number corresponds. For example, when the LSB corresponds to 1 km, it can be said that they are rounded to 1 km. Then, that sequence of numbers is subjected to a predetermined encoding processing so that the number sequence is randomized, thereby obtaining a sequence of numbers (random numbers) which is a base of the PN series. For example, an encoded number sequence such as shown in Table 2 is obtained:

TABLE 2

| Rounding Off | → | Combining | → | Encoding |
| --- | --- | --- | --- | --- |
| 1.0, 1013, 0105, 15 | → | 101013010515 | → | 730184621803869 |
| 2.0, 1010, 0105, 15 | → | 201010010515 | → | 846247575839570 |
| 3.5, 1008, 0107, 15 | → | 351008010715 | → | 846120973956829 |

The PN series is created based on the thus-obtained number sequence, and the obtained result is used to perform spread spectrum communication. It is to be noted that the information to be actually transmitted may include the accurate time, positional information, existence probability at that position, and other information, and this is turned into pulses to be carried as digital communication. It should be noted that any other useful or helpful information may be likewise included.

On the other hand, on the receiving side, although a sequence of numbers is generated based on the rounded time and positional data of the user's vehicle as similar to the transmitting side, a number sequence to which the proximate data is added is generated if necessary. For example, a plurality of sequences of numbers such as shown in Table 3 are generated and these are used to perform the inverse spectrum spreading:

TABLE 3

| Time, Position | → Adding Proximate Data | → Combining | → Encoding |
| --- | --- | --- | --- |
| 1.0, 1013, 0105, 15 | → 1.0, 1013, 0105, 15 | → 101013010515 | → 730184621803869 |
|  | → 1.0, 1014, 0105, 15 | → 101014010515 | → 530144621893867 |
|  | → 1.5, 1013, 0105, 15 | → 151013010515 | → 730884621893865 |
|  | → 1.5, 1013, 0106, 15 | → 151013010615 | → 930984621703863 |
| 2.0, 1010, 0105, 15 | → 2.0, 1010, 0105, 15 | → 201010010515 | → 846247575839570 |
|  | → 2.0, 1009, 0105, 15 | → 201009010515 | → 746368986539547 |
|  | → 2.5, 1010, 0105, 15 | → 251010010515 | → 346247575839578 |
| 3.5, 1008, 0107, 15 | → 3.5, 1008, 0107, 15 | → 351008010715 | → 846120973956829 |
|  | → 3.5, 1007, 0108, 15 | → 351007010815 | → 846120973957820 |
|  | → 4.0, 1009, 0107, 15 | → 401009010715 | → 746128973956828 |

In this manner, the transmitting side estimates the position to which the user's vehicle will move in the future over time and uses the PN series based on this estimation to create the spread spectrum. Similarly, on the receiving side, the inverse spread spectrum is created in accordance with the PN code based on the position to which the user's vehicle will move in the future (including the proximity) and the time. Therefore, the data obtained by the inverse spread spectrum corresponds to the information about a vehicle that runs in the vicinity if the user's vehicle travels in the future.

When the proximate data is processed in the encoding in such a manner that the number sequence is also turned to a proximate number sequence, addition of the data can be omitted. That is, if the sequence of number is the proximate counterpart, the PN series is likewise turned to the proximate PN series to be received as leakage electromagnetic radiation.

The thus-generated number sequence is received as random numbers for determining the PN series. In this way, a plurality of PN series signals may be received by one receiver in time series, or the respective PN series signals may be received by a plurality of receivers in parallel. Further, combining the above-described sequences of numbers can generate and simultaneously receive the PN series for receiving all the related signals. In such a case, the data is then separated based on each PN series.

In this fashion, the PN series is generated based on the current and future positions, and each vehicle transmits the information obtained by performing spectrum spreading using the PN series. On the other hand, as to reception, the inverse spread spectrum utilizing the PN series generated based on the current and future positions of the user's vehicle is created. Accordingly, the information to be received is restricted to that having the matched PN series, i.e., the current and future positions overlapping on the positions of the user's vehicle. It is to be noted that setting a range that the positional data indicates to a wide system also enlarges the receivable range. In this manner, since the communication protocol itself includes the positional information, just the information concerning the user's vehicle need be selected to enable reception.

Although the above example is one wherein the PN series is used as the spread spectrum, a similar operation is possible using frequency hopping. That is, on the transmitting side, a pattern for a hopping frequency is created based on an encoded number sequence (random numbers) generated as shown in Table 2, and the hopping frequency is used to modulate the carrier. In other words, the frequency is subjected to hopping in accordance with the PN series generated in the PN series generator shown in FIG. 2, and a signal obtained by frequency hopping is mixed with a primary modulation signal to carry out the spread spectrum modulation, thereby transmitting the data. On the other hand, on the receiving side, the generated hopping frequency is used based on an encoded number sequence (random numbers) produced as shown in Table 3 to create the inverse spread spectrum, thereby demodulation the data.

Moreover, in the above example, different sequences of numbers are generated from the time and position values and the spread spectrum is created from these on the transmitting side. Therefore, the data to be sent is divided using different sequences of numbers and thereafter transmitted. However, the data which is the content of transmission may be subjected to the spread spectrum as a single data packet by using a single sequence of numbers.

In such a case, a number sequence used for the spread spectrum (PN series, hopping frequency) may be created based on only the current position coordinate of the user's vehicle. Here, the LSB of the position coordinate to be rounded off is set large. By doing so, a transmission signal can be received in a vehicle in a relatively-large range surrounding the position of the user's vehicle.

Additionally, setting the large LSB can increase the probability that a plurality of vehicles exist at the same position. Thus, in order to eliminate interference of signals transmitted from a plurality of vehicles, it is preferable to add a sequence of numbers corresponding to a vehicle ID to a sequence of numbers of the position information to determine a sequence of numbers for the spread spectrum. For example, as shown in Table 4, the vehicle ID is added before the positional data:

TABLE 4

| Vehicle ID, Position (Coordinate) | → | Combining | → | Encoding |
|---|---|---|---|---|
| 0323, (1012.0, 1411.0, 15.0) | → | 03231012141115 | → | 846120973956829 |

Spread spectrum modulation is executed using the thus-obtained sequence of numbers. On the other hand, the vehicle ID on the transmitting side is unknown on the receiving side. Therefore, the PN series having all the combinations is generated with respect to the part corresponding to the vehicle ID, and information from a plurality of vehicles are individually received. According to this method, there is no problem in interference of communication from a plurality of vehicles having the data in which the PN series other than the vehicle ID is the same (times and positions are identical).

Further, the vehicle ID may be inserted into the transmission data in place of the PN series. As a result, the vehicle ID can be recognized after reception and the information for each vehicle can be individually obtained.

In this manner, the data representative of the traveling state of another vehicle concerning the future running of the user's vehicle can be automatically obtained. Therefore, various kinds of processing can be performed based on this data. Particularly, in the present embodiment, special processing for extracting the data relating to the user's vehicle need not be carried out, and there is additional merit in that the data concerning the user's vehicle can be automatically selected.

Probability of Scrape, Calculation of Impact Shock

The relationship between the time and the position of a vehicle in the future can be estimated based on the current traveling status. For example, after input, the current GPS position coordinate, a turning speed (yaw rate), a steering angle, a vehicle speed, an acceleration, a driving torque estimate, a road surface $\mu$ estimate, a road surface cant, a slope estimate, an estimated weight of vehicle and others, the position coordinates of four corners of a vehicle in a space-time from the present to a few seconds later can be calculated.

For estimation, any of the following example methods may be employed:
 (i) a sequential simulation is carried out in accordance with a two-wheeled or four-wheeled vehicle model to specify a spatiotemporal position; and
 (ii) the above inputs, the spatiotemporal coordinate from the start time to a few seconds later and a probability distribution pattern are previously calculated a number of times to sequentially specify a spatiotemporal position from the input data during traveling by a neutral network, etc.

In this way, the future position coordinate of the vehicle can be estimated, and hence the user's vehicle can inform another vehicle of its future motion by transmitting the vehicle position from each vehicle.

Thus, when receiving a spatiotemporal position of another vehicle, comparing the spatiotemporal position of each vehicle with that of the user's vehicle can obtain the collision probability. That is, if the spatiotemporal positions of the user's vehicle and another vehicle overlap one on another at parts where each existence probability is 100%, the probability of scrape is 100%. Further, if they overlap one on another at a part where the existence probability is 1 to 100%, when a product of the probabilities of the overlapped parts is a maximum value, that value is the existence probability.

Since the velocity vector of both the user's and that of the other party are known, a magnitude of impact shock is a value which is proportionate to the square of an absolute value of the obtained relative velocity of the both vehicles at the time of occurrence of the first scrape probability.

In this manner, the probability of scrape and the magnitude of impact shock can be estimated. Thus, the ECU controls the actuator to operate the brake and/or the steering, thereby executing the avoidance operation.

Further, during automatic driving, distance control may be carried out wherein a target course for assuring a sufficient distance between the user's vehicle and another vehicle for averting collision or the like is calculated, and the vehicle is guided to this course.

Furthermore, during route searching, a number of vehicles traveling in the same space-time at an intersection through which those vehicles will pass is determined based on the received data, and recalculation of the route and other data is executed.

Figure 4A:
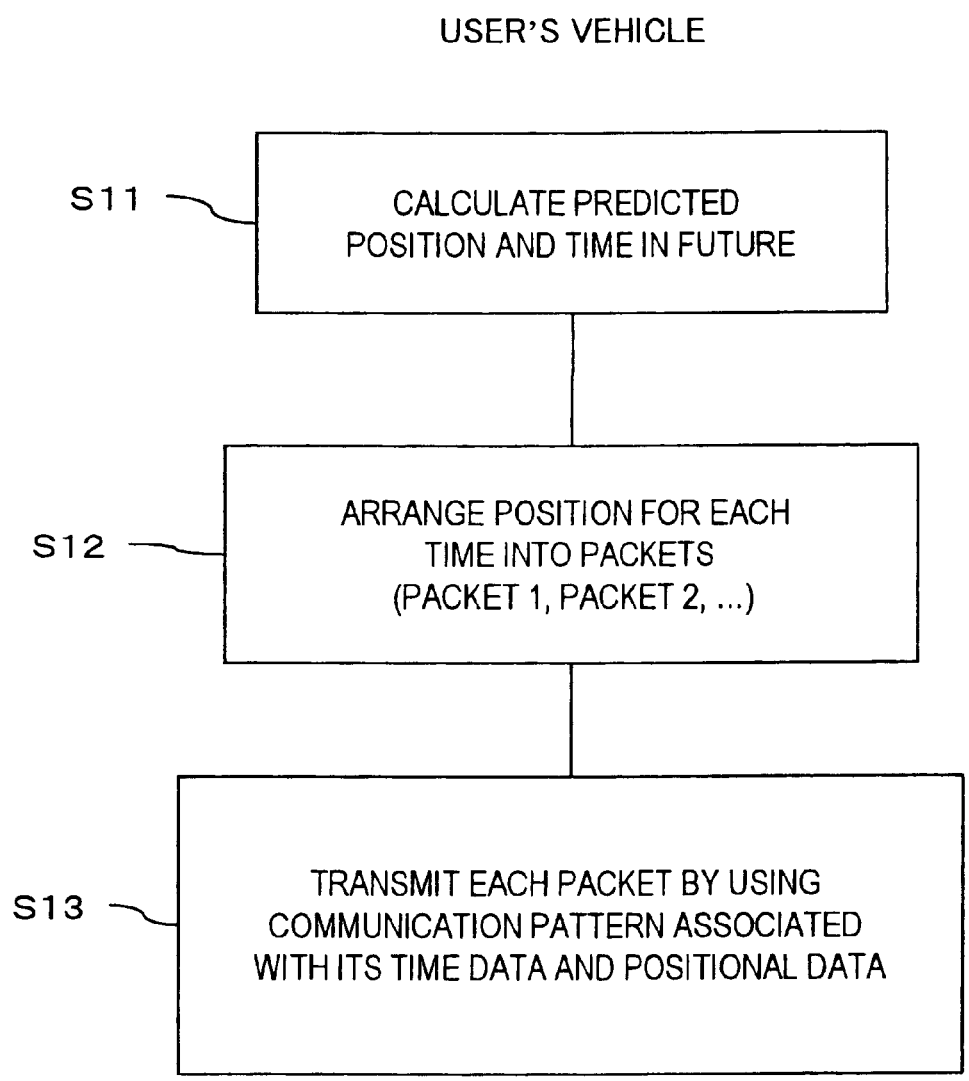
FIGS. 4A and 4B are views showing the content of communication of the apparatus shown in FIG. 1.
Figure 4B:
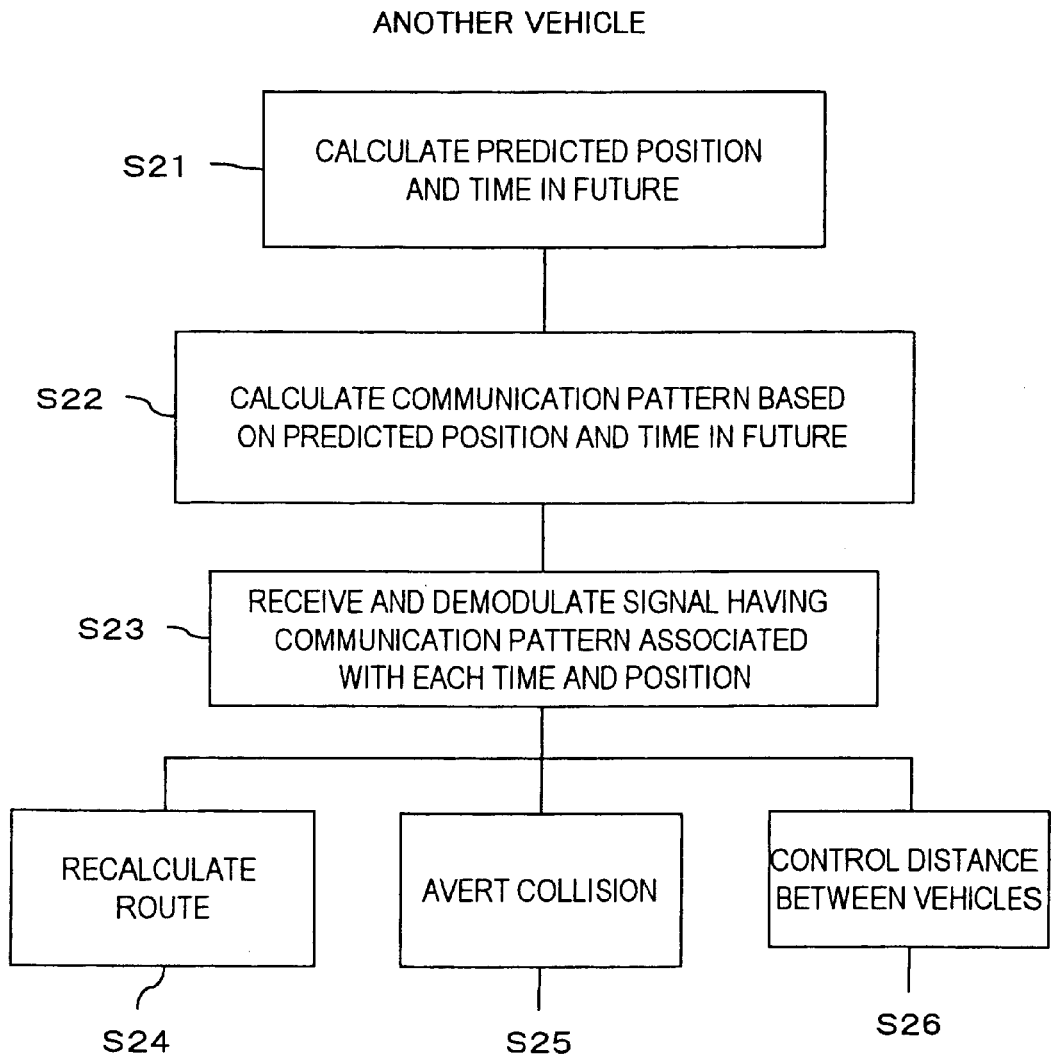

Here, FIG. 4A shows a flowchart of the transmission processing by the user's vehicle, while FIG. 4B shows the processing in another vehicle that receives the transmitted data.

The user's vehicle obtains its position derived by GPS or other means and predicts its future from detection values from various sensors to calculate a predicted position in the future with the time as a function (S11). Then, the data representative of positions of the user's vehicle at the present time, two seconds later, . . . , n seconds later are arranged into individual data packets (packet 1 (the present, the position coordinate at the present time), packet 2 (two seconds later, the coordinate of two seconds later), . . . ) (S12). Each packet is transmitted in accordance with the communication pattern (the PN series or the frequency hopping) associated with its time and coordinate (S13).

On the other hand, in another vehicle, a predicted position in the future is obtained with the time as a function (S21) and the communication pattern associated with the obtained position and the time data is calculated as similar to the user's vehicle (S22). The data corresponding to this communication pattern is received and demodulated (S23).

Recalculation of route (S24), crash avoidance operation (S25), inter-vehicle control (S26), and other processes are carried out based on the obtained data.

Second Embodiment

A system which can change the PN series or the transmission series of the frequency hopping and a range of reception search in accordance with conditions such as a vehicle position grasping situation, a state of approach of another vehicle, a vehicle state and which can rapidly obtain information as needed is described in the second preferred embodiment of the present invention.

Figure 5:
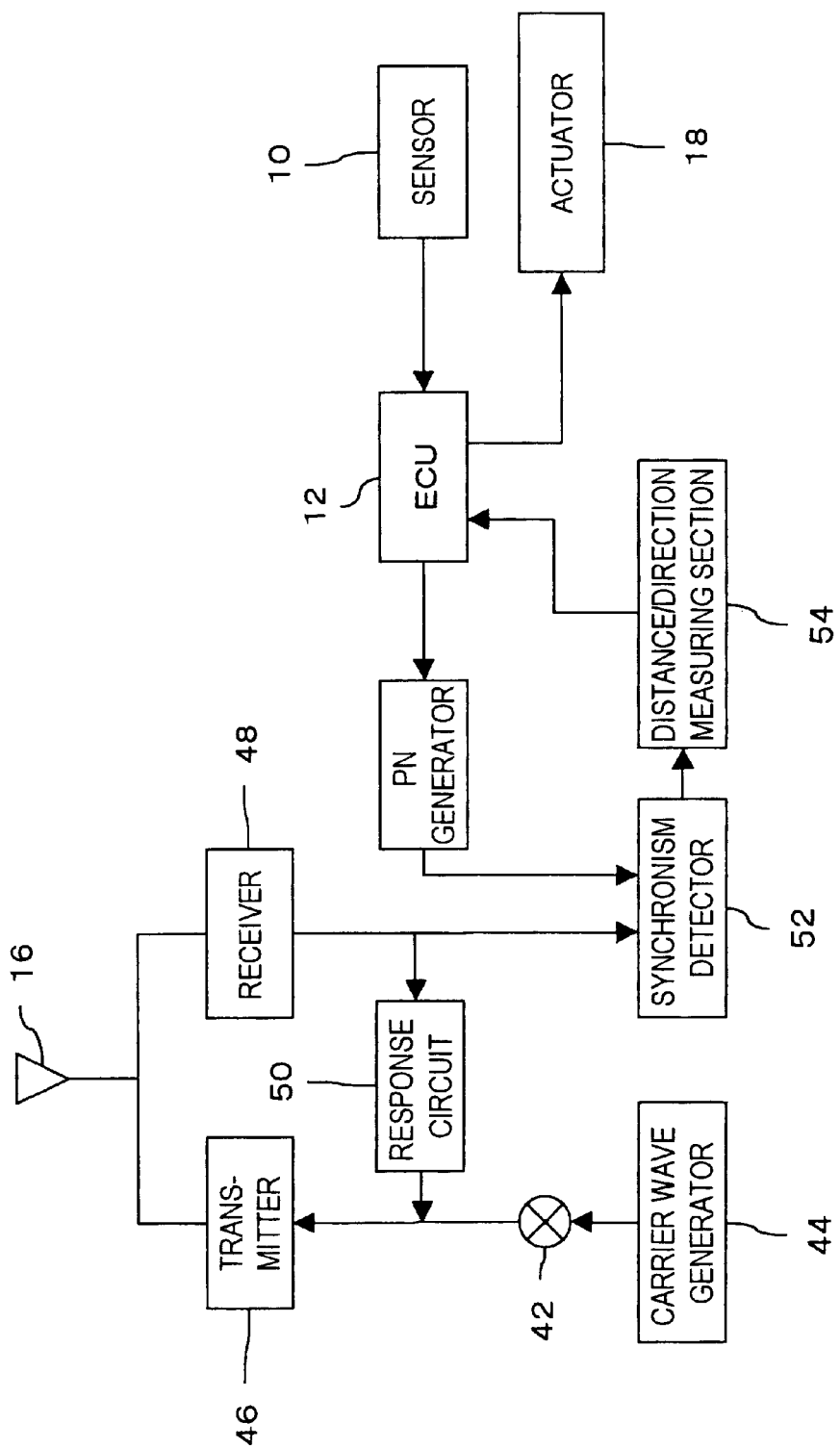
FIG. 5 is a block diagram showing an example of the structure according to a second embodiment of the present invention.

In this system, on a user's vehicle is mounted an inter-vehicle communication apparatus as shown in FIG. 5. A detection signal from a sensor 10 is supplied to an ECU 12. The ECU 12 grasps the state of the user's vehicle such as current or future positions of the user's vehicle. The ECU 12 feeds such positional data to a PN generator 40. The PN generator 40 produces a PN series based on the positional data as described above and supplies it to a multiplier 42. To the multiplier 42 is supplied a predetermined carrier wave from a carrier wave generating section 44, and the spread spectrum is carried out by multiplying the carrier wave by the PN series. The obtained result is supplied to an antenna 16 via a transmitter 46 to be transmitted from the antenna 16.

An actuator 18 for brake or steering is further connected to the ECU 12 and, when it is determined by this ECU 12 that operation of the brake or the steering is necessary, the actuator 18 is driven to operate the brake or steering accordingly.

Meanwhile, an electric wave received by the antenna 16 is subjected to reception processing in a receiver 48, and the obtained reception signal is fed to a response circuit 50. This response circuit 50 does not change the PN code of the reception signal but rather frequency-converts the reception signal to produce a response signal as a signal having a carrier wave different from that of the received frequency. The response circuit 50 also supplies a response signal which is delayed by a predetermined delay time to the antenna 16 through the transmitter 46. Therefore, the PN series by which the reception signal is transmitted is delayed by a predetermined time and the response signal is returned with the carrier wave having a different frequency.

A signal from the multiplier 42 is added to the response signal so that information of the user's vehicle is included in the result signal. Although the PN series to be multiplied by the multiplier 42 may be the same PN series for reception, both can readily be separated from each other because the frequencies of the carrier waves differ.

The reception signal from the receiver 48 is also supplied to a synchronism detecting section 52. This synchronism detecting section 52 detects a phase of the PN series from the returned carrier wave. To the synchronism detecting section 52 is supplied the PN series from the PN generator 40 so that the detected PN series (received PN series) is compared with the transmitted PN series to detect a phase difference of these two types of the PN series. It may be preferable that this counting be carried out by a counter using a carrier wave as a clock as such enables highly accurate detection of phase differences.

A signal indicative of this phase difference is sent to a distance/direction measuring section 54. As described above, the phase difference of the PN series is produced because the PN series is transmitted and returned to or from another vehicle, and corresponds to the time required for the PN series to be transmitted to another vehicle and back and the time which is a sum of the delay time in the response circuit 50 of another vehicle. The time in which the PN series is transmitted and returned is made apparent by setting the delay time in the response circuit 50 in each vehicle to a fixed value, and hence the distance to another vehicle can be detected based on the obtained time.

Figure 6:
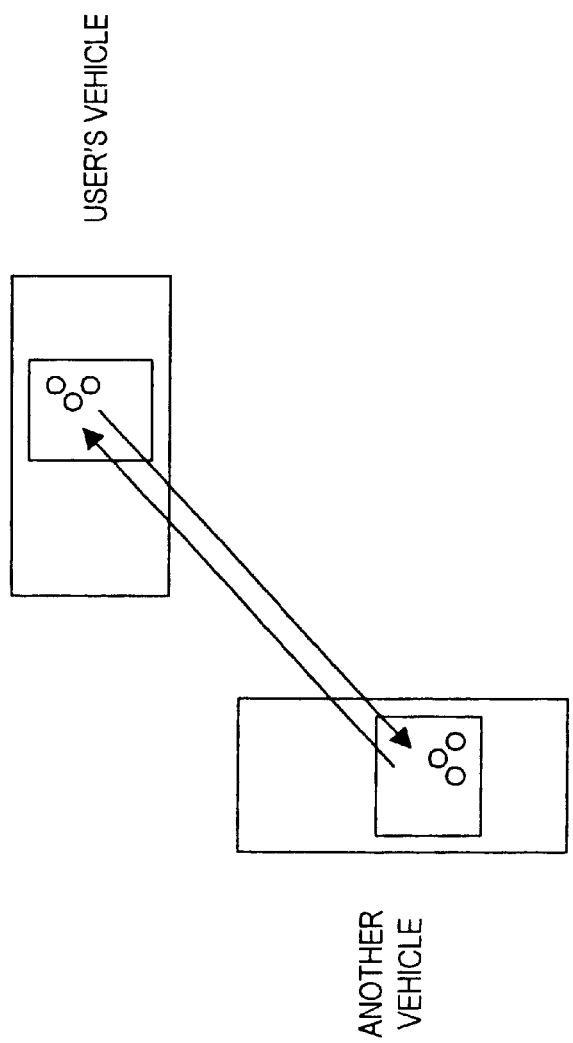
FIG. 6 is a view illustrating inter-vehicle communication according to a second embodiment of the present invention.

The detection of the distance/direction in the distance/direction measuring section 54 is described in the following using an example wherein another vehicle is also equipped with a similar apparatus so that a signal is returned from the response circuit 50 in that other vehicle. In such a case, the delay time is known in advance. Therefore, when subtracting this delay time and evaluating the phase difference of the PN series, the phase difference corresponds to a propagation time in a route where the electric wave is transmitted from the user's vehicle to another vehicle and the user's vehicle in order, as shown in FIG. 6. Accordingly, when the time corresponding to this phase difference is divided by the velocity of light and then by ½, the distance to the other vehicle can be determined.

Figure 7:
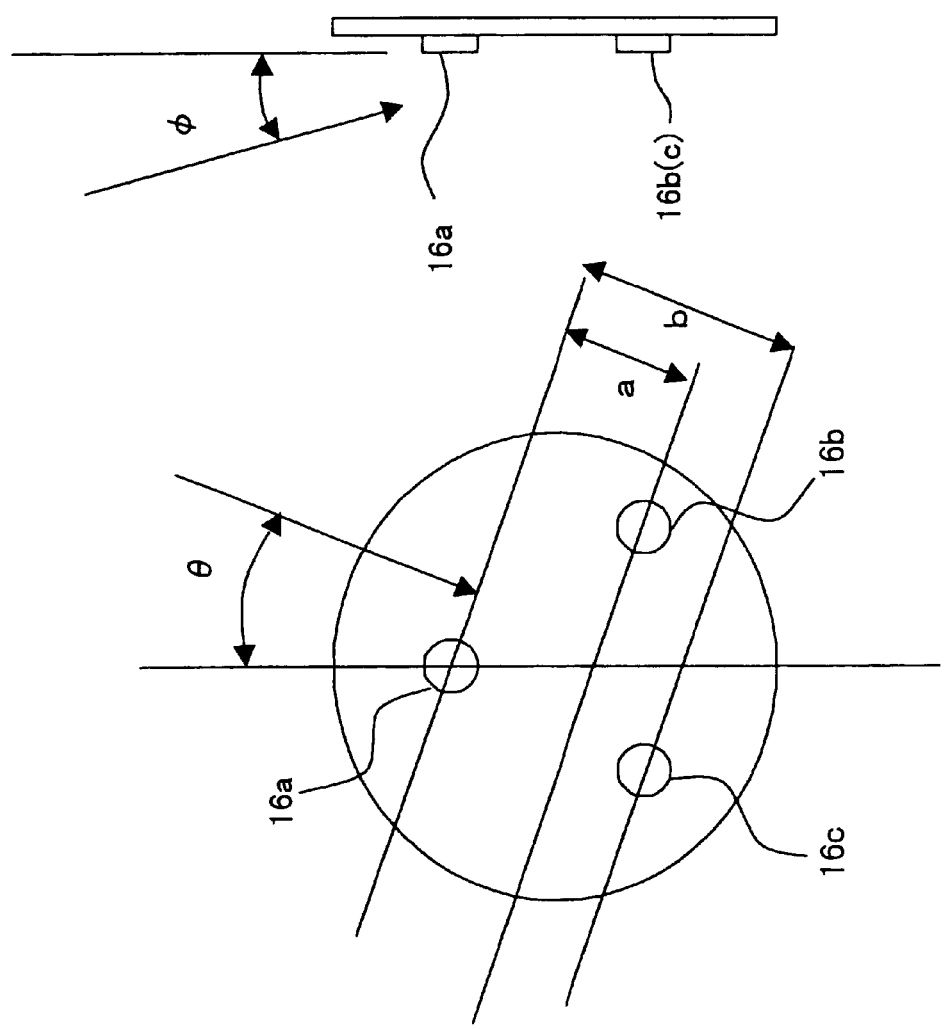
FIG. 7 is a view explaining a direction from which an electronic signal is transmitted.

Further, in this embodiment, three antennas 16a, 16b and 16c are provided as the antenna 16. All three antennas 16a, 16b and 16c are utilized to perform reception. Here, these three antennas 16a, 16b and 16c are placed so as to form a regular triangle (each inner angle is 60 degrees) as shown in FIG. 7, and the antenna 16a is set on the front side of a vehicle and a line connecting the antennas 16b and 16c is positioned in the width direction of the vehicle. If a carrier wave of the electric wave from another vehicle arrives along a direction θ with respect to a longitudinal direction of a vehicle, the carrier waves received by the antennas 16b and 16c have phase differences (distances) a and b associated with θ with respect to the carrier wave received by the antenna 16a. By detecting distances a and b from the phase differences, θ can be obtained using the following expression:

$$\theta = a\tan[-1.5(a-b)/(3a^3-3ab+3b^3)^{1/2}/\{0.866(a+b)/(3a^3-3ab+3b^3)^{1/2}\}]$$

It is to be noted that a and b are the phase differences of the carrier waves received by the antennas 16b and 16c with respect to the phase of the carrier wave received by the antenna 16a.

Additionally, an angle of elevation φ can be calculated using the following formula:

$$\phi = a\cos(\tfrac{2}{3}(3a^2-3ab+3b^2)^{1/2}/L)$$

where L is a distance between the respective antennas.

It is to be noted that the carrier wave from the carrier wave generating section 44 is modulated using information representative of the user's vehicle in the modulating section. Then, the receiving vehicle can obtain the information transmitted using the carrier wave.

Meanwhile, the reception signal obtained by the receiver 48 is fed from the synchronism detecting section 52 to the demodulating section. In this demodulating section, the PN series synchronized with the counterpart of the reception signal obtained in the synchronism detecting section 52 is multiplied to create an inverse spread spectrum. The result is then demodulated to obtain the information transmitted from another vehicle.

Figure 8:
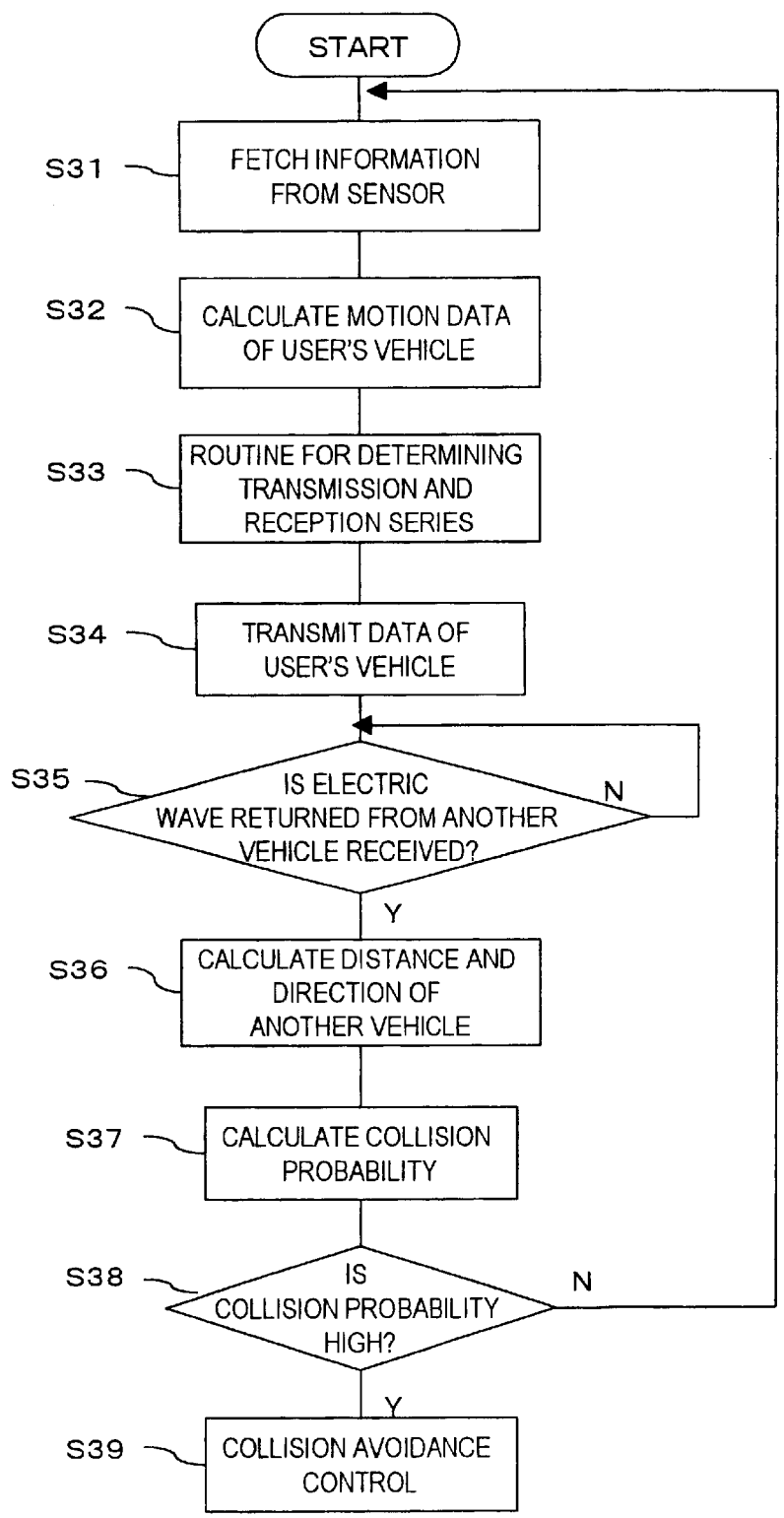
FIG. 8 is a flowchart showing the operation for averting collision.

The operation of the ECU 12 in one vehicle is e described in the following with reference to FIG. 8.

First, the information representative of the traveling condition of the user's vehicle, such as the accelerator position, the angle of the steering wheel, yaw rate, acceleration, positional information, and other data is retrieved from a detection result of the sensor 10 (S31). Subsequently, a vehicular motion of the user's vehicle is calculated from the retrieved information representative of the traveling condition (S32). For example, a trajectory of the position coordinates of the vehicle from the present time to a projected point in the future is operated and calculated utilizing a neutral network. A transmission/reception series determining routine is implemented (S33) to determine the PN series in transmission and reception. S33 is described below.

The motion data of the user's vehicle obtained from calculation of a motion of the user's vehicle is transmitted in accordance with a predetermined transmission procedure (S34). Then, a judgment is made as to whether an electric wave returned from another vehicle is obtained within a predetermined time (S35). When the judgment at S35 is NO, an arithmetic operation of a possibility of collision or the like is unnecessary, and the control returns to S31.

On the other hand, if the electric wave returned from another vehicle is received, a distance and a direction with respect to that other vehicle is calculated from phases of the transmitted wave and the returned wave as described above (S36). The probability of a collision is then calculated from the vehicular motion data, the distance and the direction of the user's vehicle and the other vehicle (S37). This calculation is executed based on a prediction calculation of future positions of both of the vehicles.

Thereafter, a judgment is made as to whether the probability of a collision is high based on a result of calculation in S37 (S38). If the probability is judged to be low, the avoidance processing or the like is not necessary, and the control returns to S31. On the other hand, when the judgment at S38 is YES, the actuator 18 is controlled to carry out the avoidance control by which the brake or the steering is operated in order to avert a collision (S39).

In this manner, the probability of a collision can be obtained by acquiring the motion data of another vehicle in the inter-vehicle communication with another vehicle and comparing it with the motion data of the user's vehicle. In particular, since the transmitted signal which was subjected to the spread spectrum modulation is obtained by further being subjected to the inverse spread based on the positional data, the inter-vehicle communication is restricted to the communication between vehicles relating to time or position. Consequently, communication can be accomplished efficiently.

Figure 9:
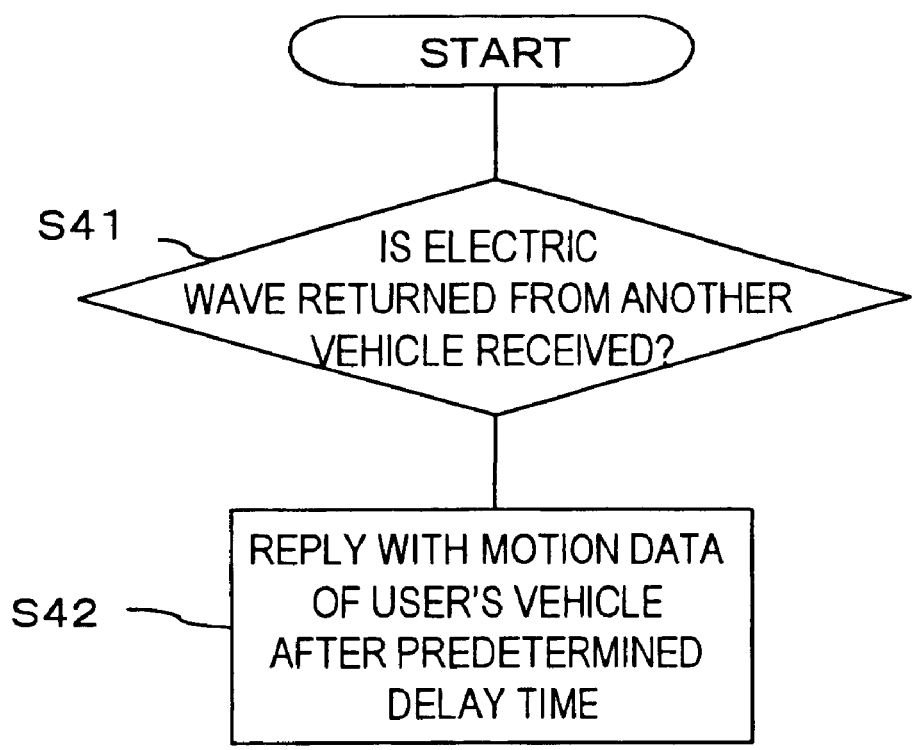
FIG. 9 is a flowchart showing the response operation according to a second embodiment of the present invention.

FIG. 9 illustrates the processing when receiving the transmitted electric wave from another vehicle. First, a judgment is made as to whether the transmitted electric wave from another vehicle is received (S41) and, if the judgment is NO, this judgment is repeated. If a YES judgment is obtained at S41, the motion data of the user's vehicle is broadcast (S42). This return operation is carried out utilizing the response circuit 50.

Figure 10:
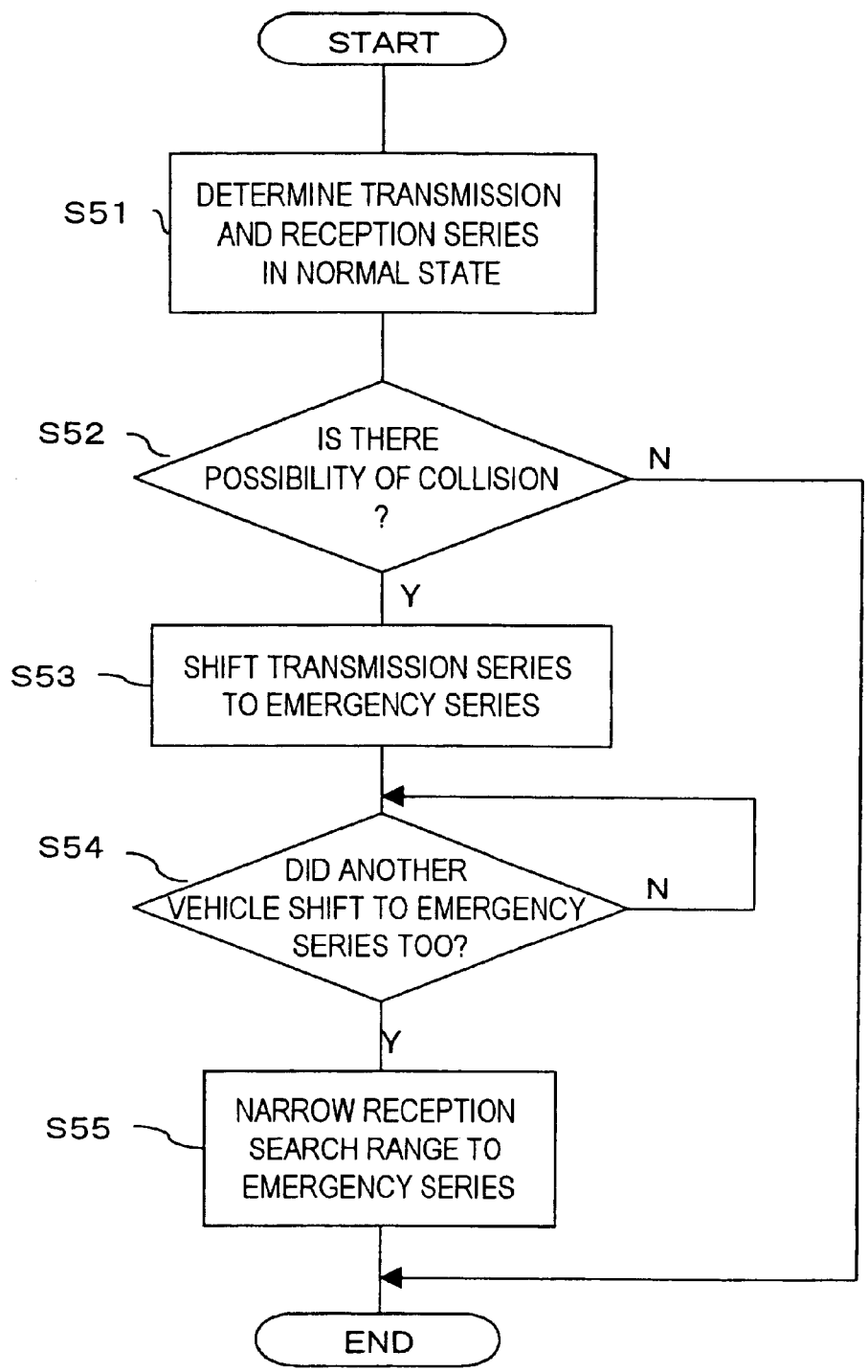
FIG. 10 is a flowchart showing the control of a transmitting/receiving series according to a second embodiment of the present invention.

FIG. 10 shows the operation of the transmission/reception series determining routine in S33. At first, in the ordinary state, the PN series for each of transmission and reception is determined based on the position of the user's vehicle (S51).

Figure 11:
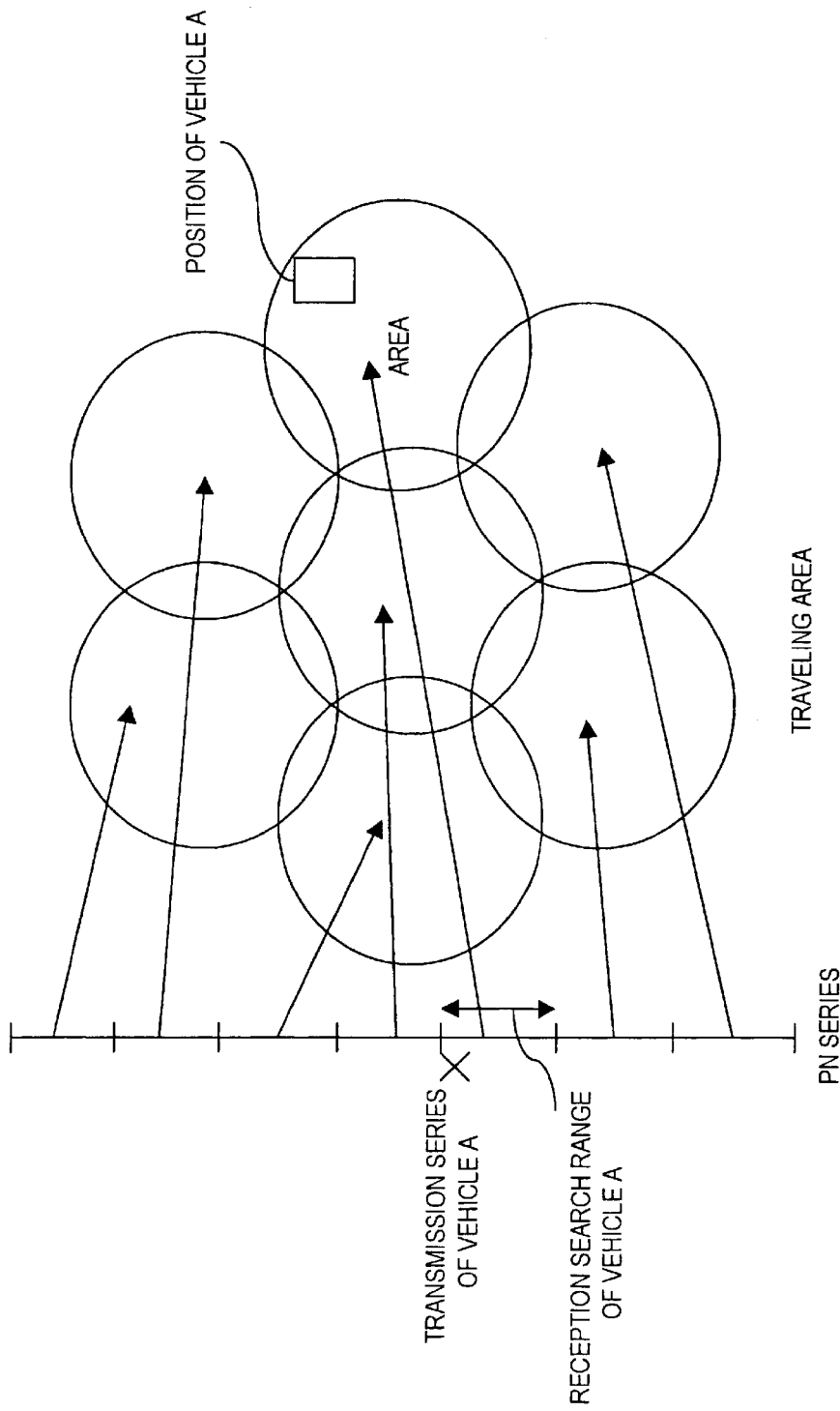
FIG. 11 shows allocation of the PN series according to a second embodiment of the present invention.

For example, it is assumed that the user's vehicle is represented as a vehicle A and it is determined that the vehicle A exists at such a position as shown in FIG. 11 using a GPS apparatus or the like. In such a case, the PN series is determined in the A vehicle as shown in FIG. 11 based on the detected positional data. In other words, the traveling area in a range in which an electric wave from the vehicle A can be received is divided as shown in the drawing. The PN series in a predetermined range is allocated in each area.

Figure 12:
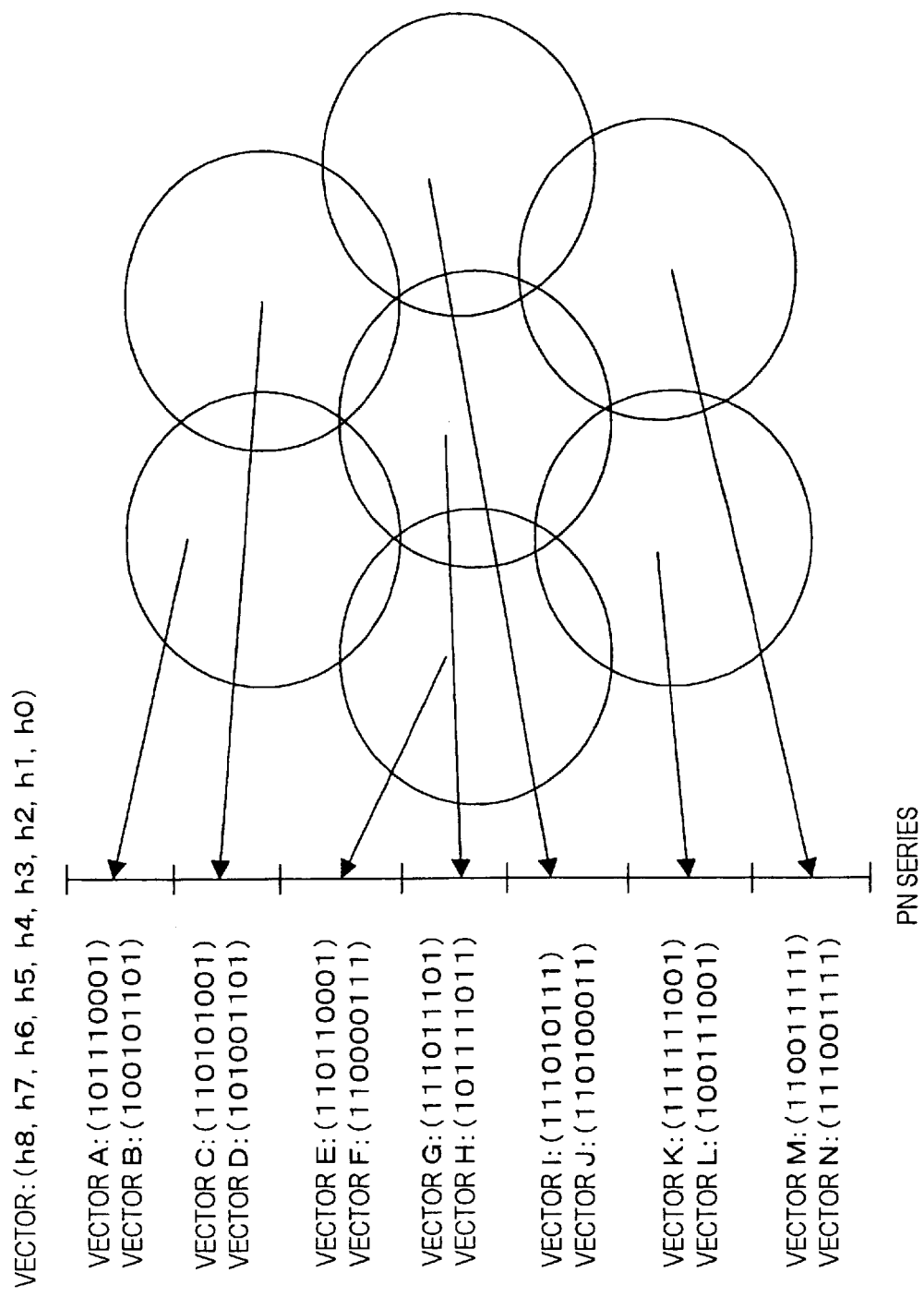
FIG. 12 shows allocation of positional data according to a second embodiment of the present invention.

Two position vectors are allocated to each area (seven areas in this case) for the above-described allocation of the PN series as shown in FIG. 12. Therefore, 14 position vectors are allocated as shown in the drawing. Each position vector is two-value (0, 1) data, and a 9-bit vector is used in this example. It is to be noted that establishment of a connection between the area and the vectors is periodically repeated.

Figure 13:
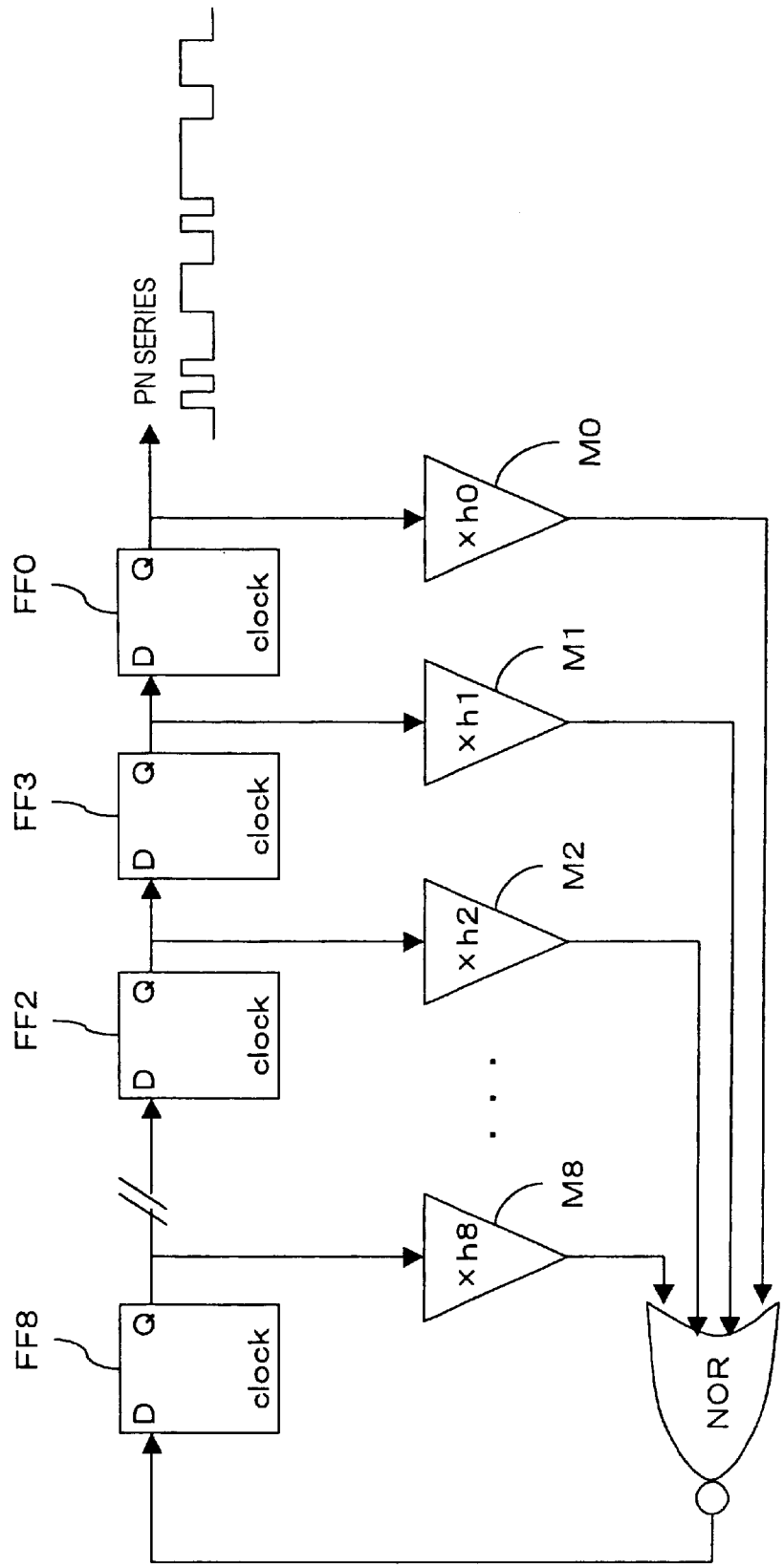
FIG. 13 shows a circuit for generating the PN series according to a second embodiment of the present invention.

A value of each bit of these position vectors h8 to h0 is used to generate the PN series. A circuit for generating the PN series is shown in, for example, FIG. 13. This circuit is constituted by nine flip-flops FF8 to FF0, nine multipliers M0 to M8, and one NOR circuit. An output from the NOR circuit is supplied to the flip-flop FF8, and the flip-flops FF8 to FF0 are connected in the multistage manner. Further, outputs from the respective flip-flops FF8 to FF0 are input to the NOR circuit through the multipliers M8 to M0.

The position vectors h8 to h0 are set to respective values in the multipliers M8 to M0. In these multipliers M8 to M0, there is no output from a multiplier having a set value equal to 0 and an output is made from a multiplier having a set value equal to 1. When a predetermined clock is input to the flip-flops FF8 to FF0, an output from a multiplier having a value set to 1 is fed back to the NOR circuit. A long periodic output called M series can be obtained in an output of the flip-flow FF0, and this is used as the PN series. It is to be noted that the PN series may be produced by any other method.

Here, two (or three or more) types of series are allocated to one area. In the allocated PN series, the upper (higher limit) one is the PN series corresponding to the positional data representative of one entire area, and the lower (lower limit) one is the PN series for specifying a small range in one area.

In the regular state, the higher limit PN series is allocated as the PN series for the transmission wave. On the other hand, in case of the reception wave, the PN series corresponding to one entire area is determined as a search range so as to enable reception of the electric wave of any PN series.

Subsequently, a judgment is made as to whether an approaching vehicle that has a possibility of a collision exists (S52). It is preferable to carry out this judgment based on a result of calculation of crash probability in S37, but this calculation may be executed by any other simple operation. If this judgment is NO, the transmission/reception series need not be changed, and the processing is therefore terminated.

Figure 14:
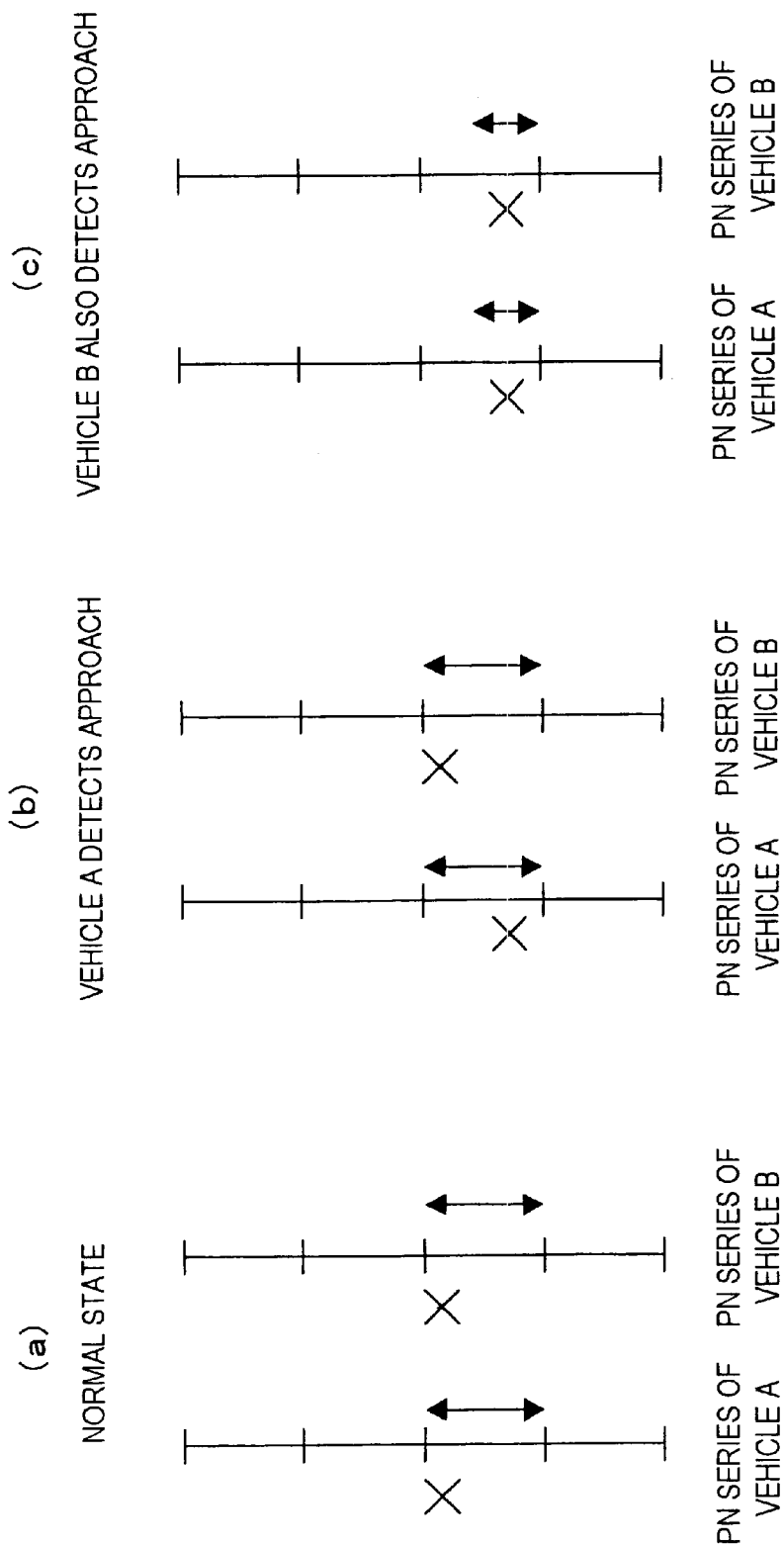
FIGS. 14(a), 14(b) and 14(c) are explanatory drawings showing control of the PN series; according to a second embodiment of the present invention

In this state, when a vehicle B exists in the vicinity of the vehicle A and performs communication utilizing the PN series based on the same positional data, as shown in FIG. 14(a), both vehicles effect transmission by using the higher limit PN series in the same PN series and carry out reception with the area to which that PN series corresponds as a reception search area.

On the other hand, if the judgment at S52 is YES, the transmission series is shifted to an emergency series (S53). In other words, transmission is carried out using the emergency series (the lower limit PN series) which is the PN series corresponding to a narrower range as the transmission series in the vehicle A. As shown in FIG. 14(b), the transmission PN series from the vehicle A is shifted to the emergency series, but the PN series from the B vehicle is yet to be shifted to the emergency transmission series. Therefore, in regard of the reception search range, the both vehicles keep to search the PN series that covers the entire area from the beginning.

Next, a judgment is made as to whether the reception series from another vehicle (the vehicle B in this example) is shifted to the emergency series (S54), and the processing waits for the shifting. The vehicle B can accurately grasp the communication from the vehicle A in particular since the A vehicle transmits the data using the emergency series, a PN series different from that of other vehicles. When the vehicle B also detects the possibility of a collision, the vehicle B shifts the PN series to the emergency series.

When the reception wave from the vehicle B is shifted to the emergency series, the reception search range is narrowed to the emergency series (S55). That is, as shown in FIG. 14(c), the both the vehicle A and the vehicle B shift their transmission series to the emergency series and narrow the reception search range only to the emergency range. Consequently, the both vehicles receive only the emergency series. Therefore, the vehicles A and B execute communication with the PN series different from that of any other vehicle and are separated from other vehicles. Additionally, since the both vehicle do not search the wider PN series, they can transmit/receive much information at high speed.

When a third vehicle C detects a possibility of a collision with either the vehicle A or the vehicle B, the vehicle C can break into the communication between the vehicles A and B.

As described above, when any other party having a possibility of a collision exists, the communication with a vehicle having a risk can take precedence over that with other multiple vehicles to attain high-speed communication.

As described above, according to the system of the first and second embodiments, the communication protocol includes at least the positional data. Therefore, only the data relating to a position of the user's vehicle can be received. Further, by using the emergency series, it is possible to limit a vehicle to communicate with in case of emergency.

Third Embodiment

Figure 15:
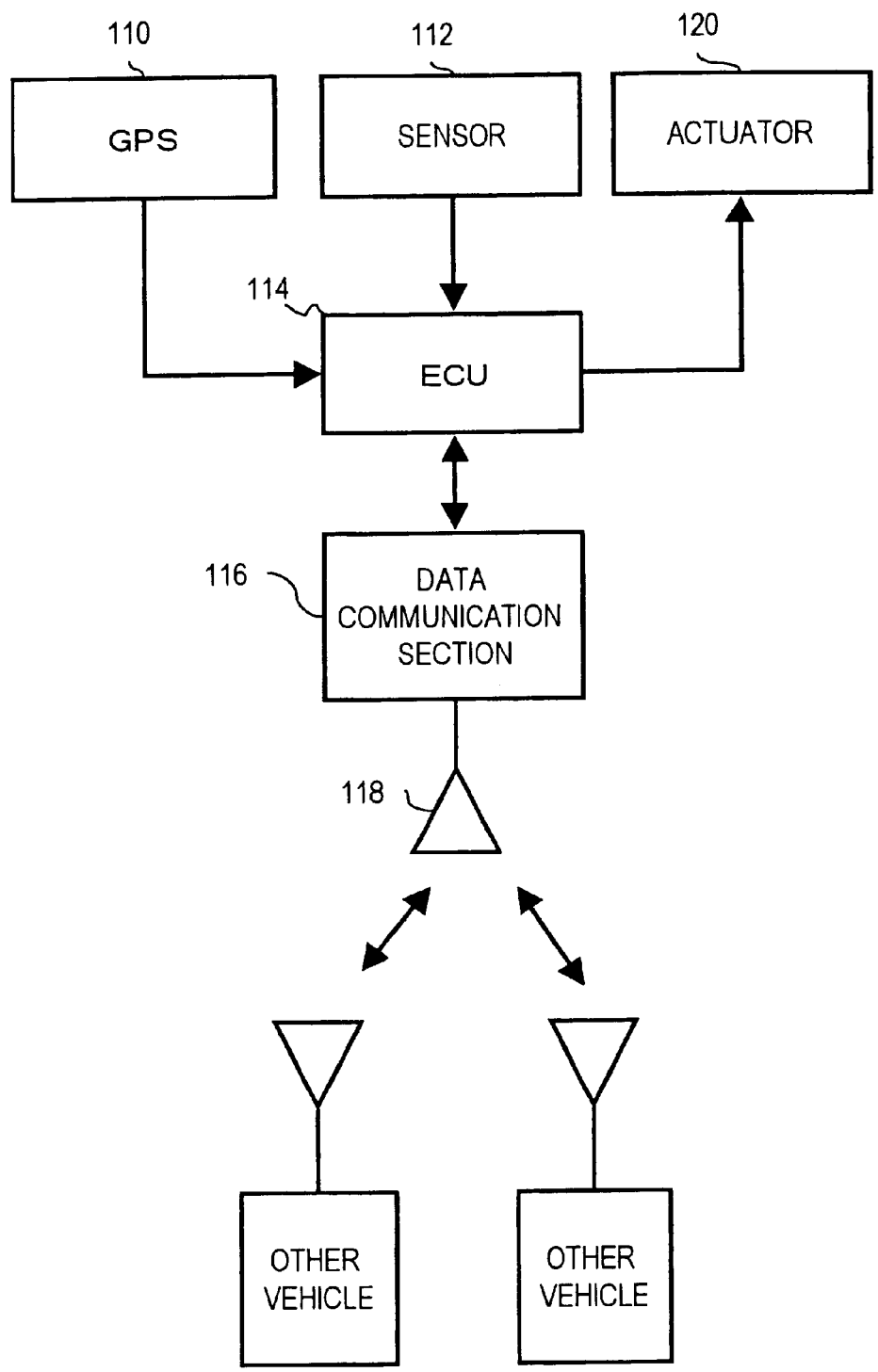
FIG. 15 is a block diagram showing the system structure of a vehicle crash avoidance control apparatus according to a third embodiment of the present invention.

FIG. 15 is a block diagram showing the system structure of a vehicle crash avoidance control apparatus according to a third embodiment of the present invention. A detection signal from a GPS and a sensor 112 such as a steering or a clock is supplied to the ECU 114. The later-described positional data and existence probability data of the user's vehicle is supplied from the ECU 114 to a data communication section 116 and transmitted to an other vehicle via an antenna 118. Moreover, the positional data and the existence probability data from the other vehicle is received by the antenna 118 and supplied to the ECU 114 through the data communication section 116. The ECU 114 uses the respective supplied data to calculate the later-described probability of a collision and spatiotemporal position and recognizes the need of avoidance of a collision.

In addition, an actuator 120 for brake or steering is connected to the ECU 114. When it is determined in the ECU 114 that avoidance of a collision is necessary, the actuator 120 is driven to operate the brake or the steering to avoid a collision with another vehicle.

As described above, in the vehicle crash avoidance control apparatus according to this embodiment, the avoidance control is carried out based on the probability of a collision and a spatiotemporal position of a collision calculated by the ECU 114.

The control for avoiding a collision with another vehicle using the above-mentioned system will now be described in detail with reference to the attached flowcharts.

Figure 16:
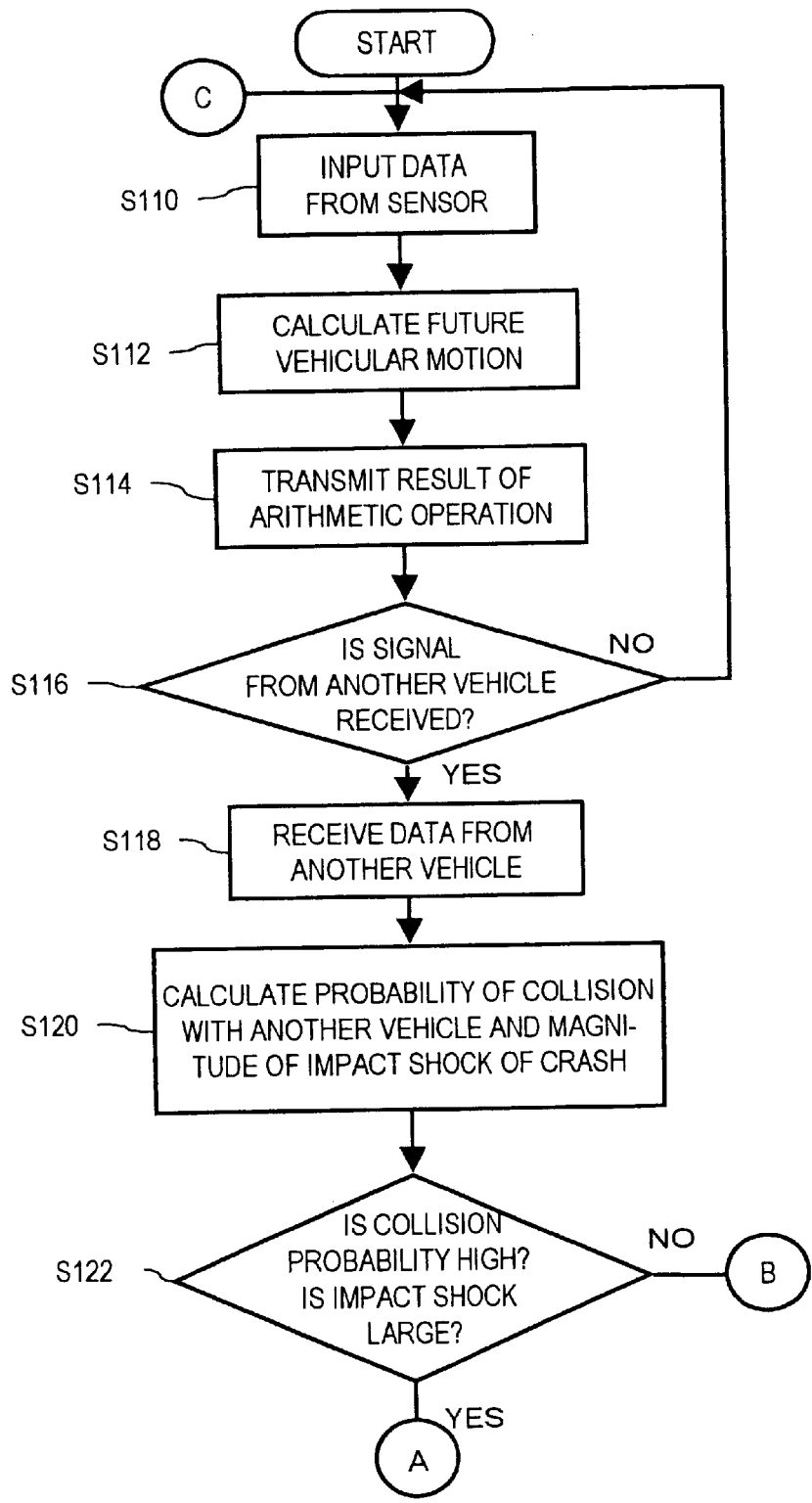
FIG. 16 is a flowchart showing a former part of the vehicle crash avoidance control processing according to the third embodiment of the present invention.
Figure 17:
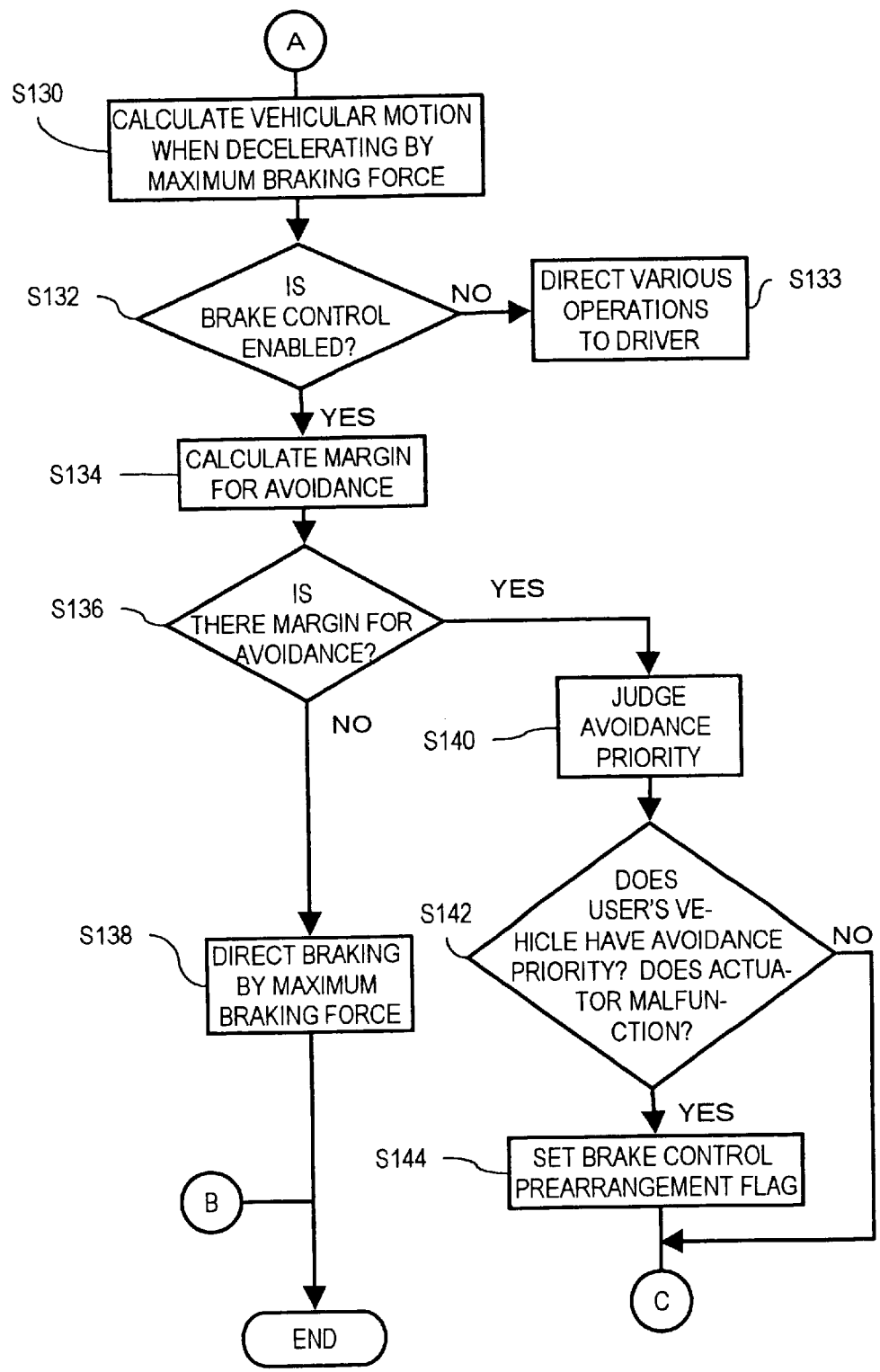
FIG. 17 is a flowchart showing a latter part of the vehicle crash avoidance control processing according to the third embodiment of the present invention.

FIGS. 16 and 17 are flowcharts in which the crash avoidance control processing in the user's vehicle is shown.

In the user's vehicle, the positional data of the user's vehicle is input from the GPS 110 to the ECU 114. Further, the data representative of a vehicular motion of the user's vehicle is inputted from the sensor 112 to the ECU 114 (S110). In this example, the data representative of a vehicular motion of the user's vehicle may include, for example, a turning velocity, an angle of a steering wheel, a vehicle speed, an acceleration, an estimate of driving torque, an estimate of a road surface friction coefficient, a road surface cant, a slope estimate, an estimated weight of a vehicle, or other information.

Subsequently, the operation for predicting the future vehicular motion is performed (S112). A sequential simulation is executed using the positional data of the user's vehicle and the data representative of the vehicular motion of the user's vehicle to calculate position coordinates of four corners of the vehicle from the present time to a few seconds later. For the positions of four corners of the user's vehicle, a vehicle model such as a vehicular width or entire length of the user's vehicle may be used. Moreover, in place of executing the sequential simulation, multiple patterns of the position coordinate and the probability distribution from the present time to a few seconds later may be learnt in advance to specify the sequential position coordinates from the input data during traveling by the neutral network.

An error may be generated in the positional data of the user's vehicle due to the state of the electric wave reception by the GPS. The data indicative of the vehicular motion of the user's vehicle may also include a given fixed error because of an error of a detecting sensor. As a countermeasure, an error is added to the position coordinate of the user's vehicle calculated based on the simulation. Then a higher limit value and a lower limit value of the position coordinate of the user's vehicle including an error are obtained.

Figure 18:
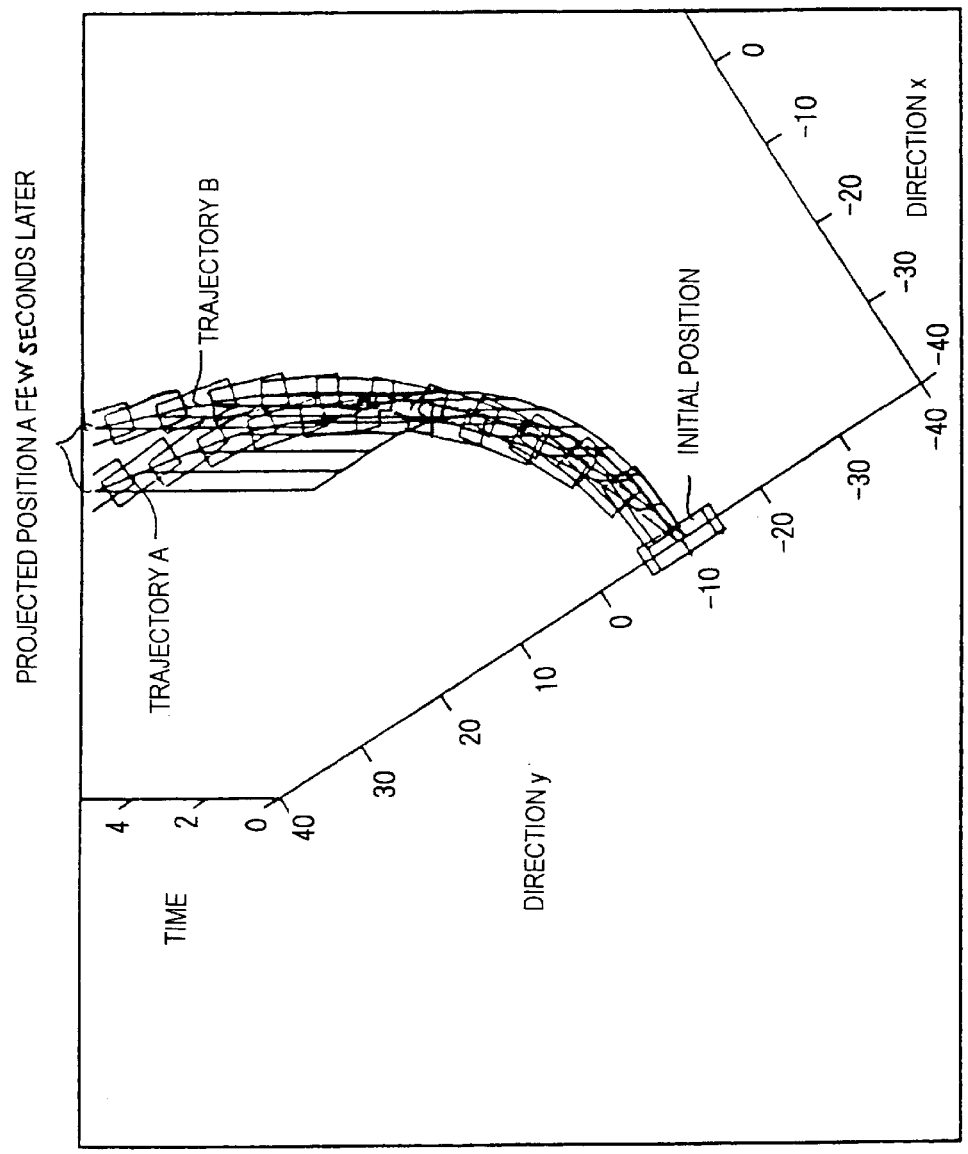
FIG. 18 is a graph showing position coordinates of four corners of a vehicle.

FIG. 18 shows the position coordinates of the four corners of the user's vehicle having an error added thereto from the present time (an initial position in FIG. 18) to a few seconds later. In this example, a trajectory A is a higher limit value of the position coordinate including an error, whilst a trajectory B is a lower limit value of the position coordinate including an error. The user's vehicle exists in any of spatiotemporal position on trajectory A or trajectory B.

Here, the probability that the user's vehicle exist in the space-time shown in FIG. 18 is calculated. For example, a portion where the trajectory A overlaps on the trajectory B is such a position as that the user's vehicle is expected to positively pass, i.e., such a position as that the probability of existence of the user's vehicle is expected to be 100%. Further, a portion where the both trajectories A and B do not overlap and only the trajectory A or the trajectory B exists is such a position as that the probability of existence of the user's vehicle is expected to be not less than 0% and not more than 100%. Moreover, a portion where the both trajectories A and B do not exist is such a position as that the probability of existence of the user's vehicle is expected to be 0%.

Figure 19:
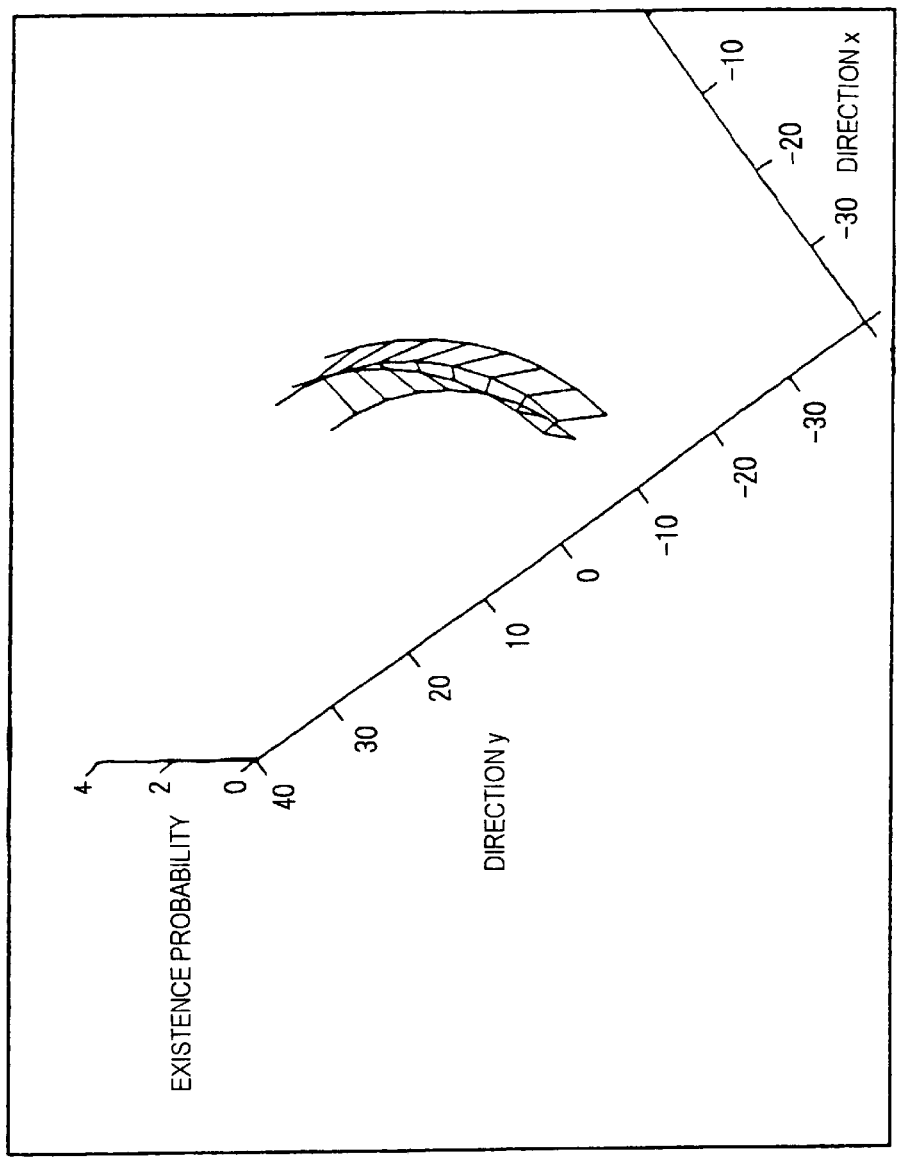
FIG. 19 is a graph showing an existence probability distribution in a space-time of the user's vehicle from present to a few seconds later.

FIG. 19 is a distribution acquired by connecting an area in which the probability of existence of the user's vehicle is 0% with an area in which the probability of the same is 100% obtained from FIG. 18 by a straight line. In this way, the probability of existence of the user's vehicle in the space-time from the present time to a few second later can be calculated.

It is to be noted that the calculation in the processing of S112 may preferably be performed in ECU 114.

As an alternative method for obtaining the existence probability distribution shown in FIG. 19, a stochastic differential equation is produced from an equation of motion of the user's vehicle, and the produced equation is solved. A method for deriving this stochastic differential equation will now be explained. An x direction and a y direction cited herein correspond to an x direction and a y direction in each of FIGS. 18 and 19.

Forces generated in four tires from a throttle, an angle of steering, and a brake are calculated. It is assumed that a force generated in the x direction which is a force generated in the tires is determined as f x i (i=1, 4) and, in particular, f x 1 and f x 2 are forces generated in the front wheels whilst f x 3 and f x 4 are forces generated in the rear wheels. Further, it is assumed that a force generated in the y direction which is a force generated in the tires is determined as f y i (i=1, 4) and, in particular, f y 1 and f y 2 are forces generated in the front wheels while f y 3 and f y 4 are forces generated in the rear wheels. Additionally, assuming that: Vx is an X direction component of the car body velocity; Vy, a Y direction component of the car body velocity; r, a yaw angle velocity; M, a mass of a vehicle; I, an inertia moment of a vehicle; Lf, a distance from a center of gravity to front wheels of a vehicle; Lr, a distance from a center of gravity to rear wheels of a vehicle; Df, a tread of the front wheels; and Dr, a tread of the rear wheels, the following three equations of motion can be obtained:

$$M(dVx/dt)=\Sigma f\,x\,i+M\cdot Vy\cdot r \quad (1)$$

$$M(dVy/dt)=\Sigma f\,y\,i+M\cdot Vx\cdot r \quad (2)$$

$$I(dr/dt)=Lf(f\,x\,1+f\,x\,2)+Lr(f\,x\,3+f\,x\,4)+2/Df(f\,y\,1+f\,y\,2)+2/Dr(f\,y\,3+f\,y\,4) \quad (3)$$

From the above equations (1), (2) and (3), the following three equations for deriving a slip angle β and coordinates of the center of gravity of the user's vehicle X and Y can be obtained:

$$\beta=\tan^{-1}(Vy/Vx) \quad (4)$$

$$X=\int\{\sqrt{(Vx^2+Vy^2)}\cdot\cos(\beta+\int r\,dt)\}dt \quad (5)$$

$$Y=\int\{\sqrt{(Vx^2+Vy^2)}\cdot\sin(\beta+\int r\,dt)\}dt \quad (6)$$

The position coordinates of the four corners of the user's vehicle can be derived from the coordinates of the center of gravity of the user's vehicle calculated from the above (4), (5) and (6).

The existence probability distribution shown in FIG. 19 is then obtained by utilizing the above equations (4), (5) and (6). It is assumed that the position coordinate of a vehicle at a given time is determined as (b1(t), b2(t)). b1 is derived from the above expression (5); and b2 is derived from the above expression (6). It is assumed that an error generated due to irregularity in the vehicle characteristics or a drive's behavior is determined as σij(i, j=x, y) and the existence probability distribution to be obtained is determined as u (t, x, y). With σij as a spread coefficient, the following partial differential equation can be derived from the Kolmogorov equation:

$$\partial u/\partial t=1/2\cdot\Sigma\{\{\Sigma\sigma ki\sigma kj)\cdot\partial^2 u/(\partial i\cdot\partial j)\}+\Sigma(bl\cdot\partial/\partial 1)\text{ where }(i,k,j,l=x,y) \quad (7)$$

A first member in the partial differential equation (7) is a member that indicates the spread and represents that inconsistency in the vehicle characteristics or a driver's behavior results in the extended range of the possible position of the vehicle with elapse of time. Further, a second member in the equation (7) represents a change in position due to vehicular motion when there is no spread, i.e., the vehicular motion when there is no inconsistency in the vehicle characteristics or a driver's behavior. The equation (7) is solved by the sequential calculation to obtain a numeric solution of the existence probability distribution μ. In this manner, the probability distribution shown in FIG. 19 can be obtained from the equation. The position coordinate of the four corners and the existence probability distribution of the user's distribution can be derived by use of the equation in this manner.

The position coordinate of the four corners of the user's vehicle from the present time to a few seconds later shown in FIG. 18 and the data of the existence probability distribution shown in FIG. 5 are transmitted from the antenna 18 to another vehicle through the data communication section 16 (S114).

On the other hand, the above-described arithmetic operation is also performed in another vehicle to transmit the data representative of the position coordinates of the four corners and the existence probability distribution of another vehicle from the present time to a few seconds later.

In the user's vehicle, a judgment is then made as to whether the signal from another vehicle has been received (S116). If NO, it is determined that there is no other vehicle near the user's vehicle and the control returns to the processing S110. If YES, it is determined that there is another vehicle near the user's vehicle and data representative of the position coordinates of the four corners and the existence probability distribution of another vehicle transmitted from that vehicle is received from the antenna 118 through the data communication section (S118).

Figure 20:
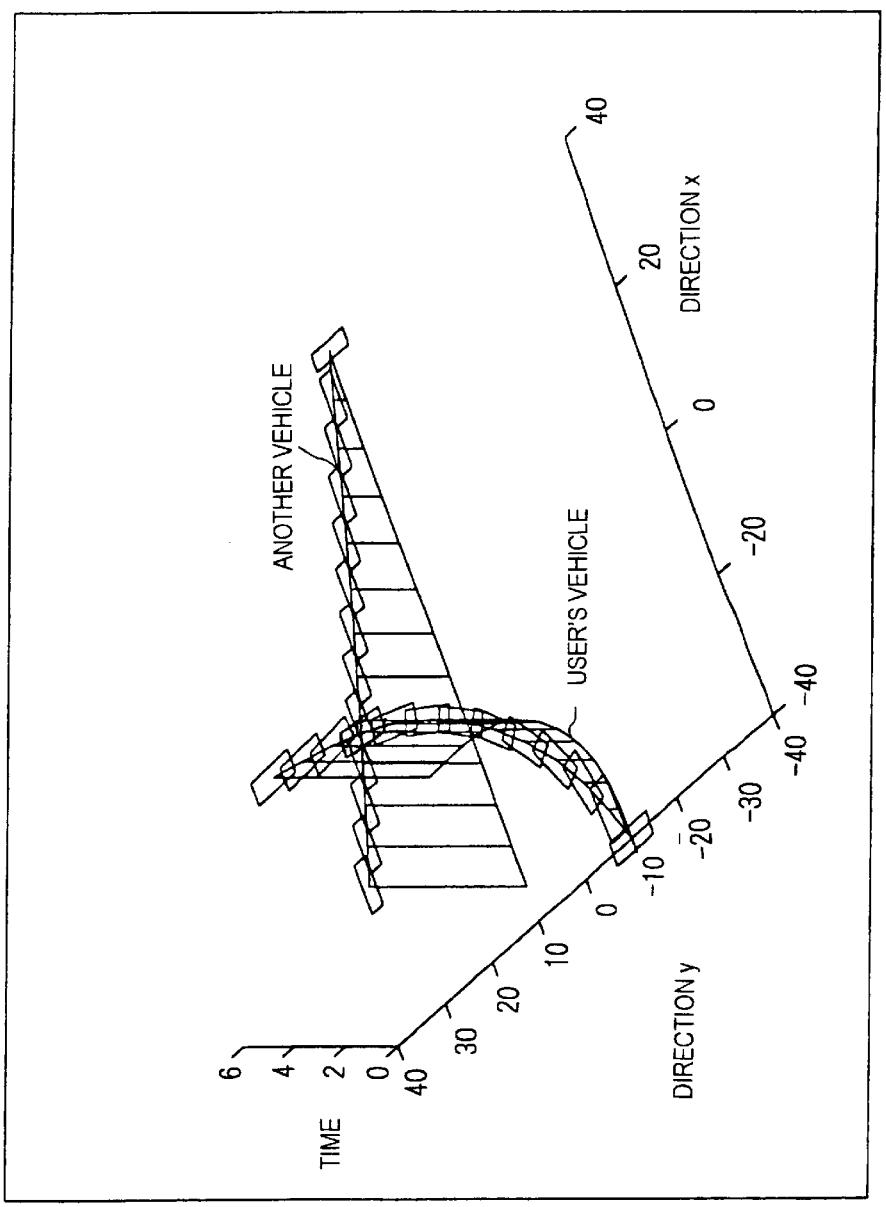
FIG. 20 is a graph showing position coordinates of the user's vehicle and another vehicle from present to a few seconds later.

When a signal from another vehicle is received, the arithmetic operation for obtaining the collision probability is executed based on the received data representative of the position coordinates of the four corners and the existence probability distribution of another vehicle and the data representative of the position coordinates of the four corners and the existence probability distribution of the user's vehicle (S120). FIG. 20 shows the position coordinates at which the existence probability is 100% as a trajectory of the user's vehicle out of the position coordinates of the four corners of the user's vehicle from the present time to a few seconds later illustrated in FIG. 18. Similarly, a trajectory of another vehicle is depicted. In FIG. 20, a portion where the trajectory of the user's vehicle overlaps on that of another vehicle is a position at which a collision can be expected in the future.

Although the position coordinates at which the existence probability is 100% is a trajectory of the user's vehicle or another vehicle in FIG. 20, the position coordinates at which the existence probability is above 0% may be shown as the trajectory of the user's vehicle or another vehicle. In this case, it is preferable that the probability of a collision is a product of the existence probability of the user's vehicle and that of another vehicle at a position where the trajectory of the user's vehicle overlaps on that of another vehicle.

Also, in the processing S120, the relative velocity of the user's vehicle and another vehicle is obtained to calculate a magnitude of the impact shock which is predicted at the time of a collision between the user's vehicle and another vehicle. Since the magnitude of the impact shock can be expressed by, for example, a value which is proportionate to a square of the relative velocity of the user's vehicle and another vehicle, the relative velocity may be used as a value for judgment.

Subsequently, a judgment is made as to whether or not the crash probability is less than a given fixed value and the impact shock is large (S122). As to threshold values for the judgment in the processing S122, it is determined that the crash probability is, for example, 95% and the relative velocity representative of the magnitude of the impact shock is 40 km/s. In a NO case, because the crash probability is low or the magnitude of the impact shock is small, the crash avoidance control is not positively executed and the crash avoidance control processing is terminated. It is to be noted that an appropriate avoidance control may be directed to a driver before termination of the control in accordance with the probability of the crash. In a YES case, since the crash probability is high and the magnitude of the impact shock is large, the control returns to the processing of S130 to perform the avoidance control.

In S130, the arithmetic operation for obtaining the vehicular motion realized when decelerating by a maximum braking force is performed (S130). For example, the vehicle positions and the relative velocity of the user's vehicle and another vehicle are calculated with respect to the both a case where the user's vehicle executed the full-braking control and a case where full-braking control was not executed. A judgment is made as to whether the brake control is enabled by using the calculated relative velocity (S132). For example, when another vehicle approaches from the rear side, the relative velocity becomes a negative value. In this state, when the brake control is effected, that vehicle may come into collision with another vehicle approaching from behind. In such a case, a driver is directed to carry out various kinds of operation other than the brake control in order to avert a collision (S133).

If S132 is YES, the time required for averting a collision (a collision avoidance time) using maximum braking force is calculated (S134). When brake control is executed, the crash avoidance time can be obtained from a minimum distance relative to another vehicle and the relative velocity using the following formula:

(crash avoidance time)=(minimum distance relative to another vehicle when executed the brake control)/(relative velocity)

Based on this crash avoidance time, a judgment is made as to whether a driver has additional time before the crash (S136). If NO in S136, i.e., if the driver has not additional time before the crash, the actuator 120 is directed to apply the brake by the maximum braking force (S138) to terminate the avoidance control.

If YES in the processing of S136, i.e., if the driver has additional time before the crash, the control for averting the crash does have to be immediately executed. As a countermeasure, taking into account road conditions and the like, a judgment is made on to which of the user's vehicle or another vehicle the right for effecting the crash avoidance operation by priority (avoidance priority) is set in the future (S140).

Figure 21:
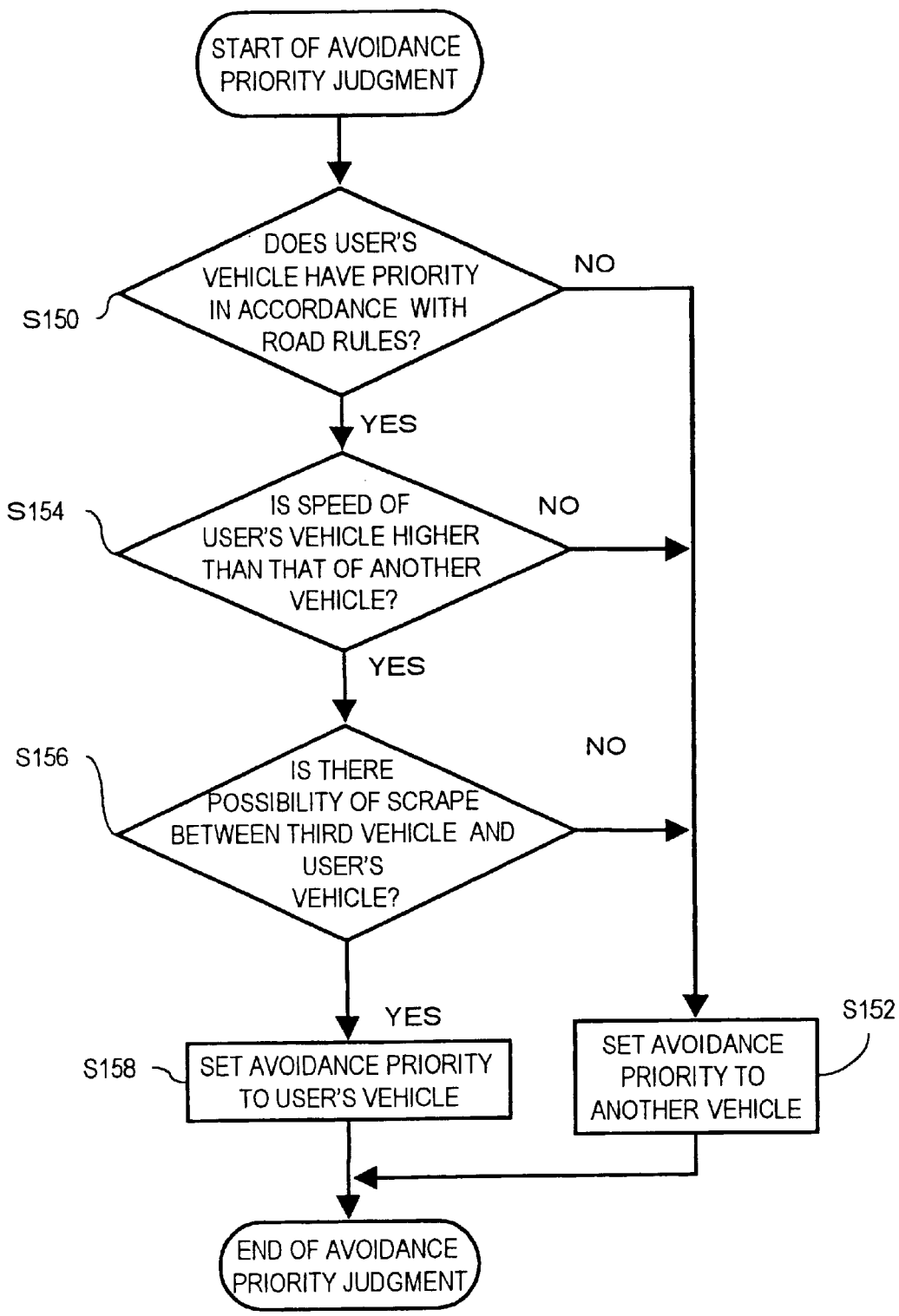
FIG. 21 is a flowchart showing determination of an avoidance priority according to the third embodiment.

FIG. 21 details the avoidance priority judgment in S150. At first, from the positional relationship between the user's vehicle and another vehicle on the road, a judgment is made as to whether the user's vehicle can travel by priority in accordance with road rules (S150). If NO, since another vehicle can travel by priority in accordance with road rules, that vehicle should perform the avoidance control by priority in the future, and the avoidance priority is set to that vehicle (S152).

If YES in S150, i.e., if the user's vehicle can run by priority in accordance with road rules, a judgment is made as to whether the speed of the user's vehicle is higher than that of another vehicle (S154). If NO, i.e., if the speed of another vehicle is lower than that of the user's vehicle, since another vehicle having the lower speed can readily execute the crash avoidance operation, the avoidance priority is set to that vehicle (S152).

If YES in S154, a judgment is then made as to whether there is a possibility of scrape between the user's vehicle and a third vehicle other than another vehicle in the future when the user's vehicle does not perform the avoidance control (S156). If NO, i.e., if there is no possibility of the user's vehicle scraping the third vehicle, since the user's vehicle does not have to be brought under the avoidance control, another vehicle should perform the avoidance control in the future by priority, and the avoidance priority is set to that vehicle (S152). If YES, i.e., if there is a possibility of the third vehicle scraping the user's vehicle in the future unless the avoidance control is executed, the avoidance priority is set to the user's vehicle (S158).

As shown in FIG. 21, when the avoidance priority is decided by the processing of S140 illustrated in FIG. 17, a judgment is then made as to whether the user's vehicle have the avoidance priority (S142). Here, in expectation that the user's vehicle has the avoidance priority and carries out the brake control in the future, a brake control prearrangement flag is set to ON (S144), and the control returns to the processing of S110. If the user's vehicle has no priority, the control directly returns to the processing of S110 without any change.

It may be preferable to check a failure of the actuator at the same time in the processing of S142.

In addition, when the brake control prearrangement flag is ON, it may be preferable to derive the trajectory of the user's vehicle obtained at the time of having performed the brake control by the user's vehicle when calculating the future vehicular motion in S112 after S110 and the following processing in FIG. 16.

As described above, in the crash avoidance control processing according to this embodiment, the highly-accurate existence probability data including the positional data and the positional error is transmitted/received between the user's vehicle and another vehicle by the inter-vehicle communication to carry out the crash avoidance control processing. The accurate motion information of another vehicle can be therefore obtained, thereby executing the further accurate avoidance control.

Fourth Embodiment

Figure 22:
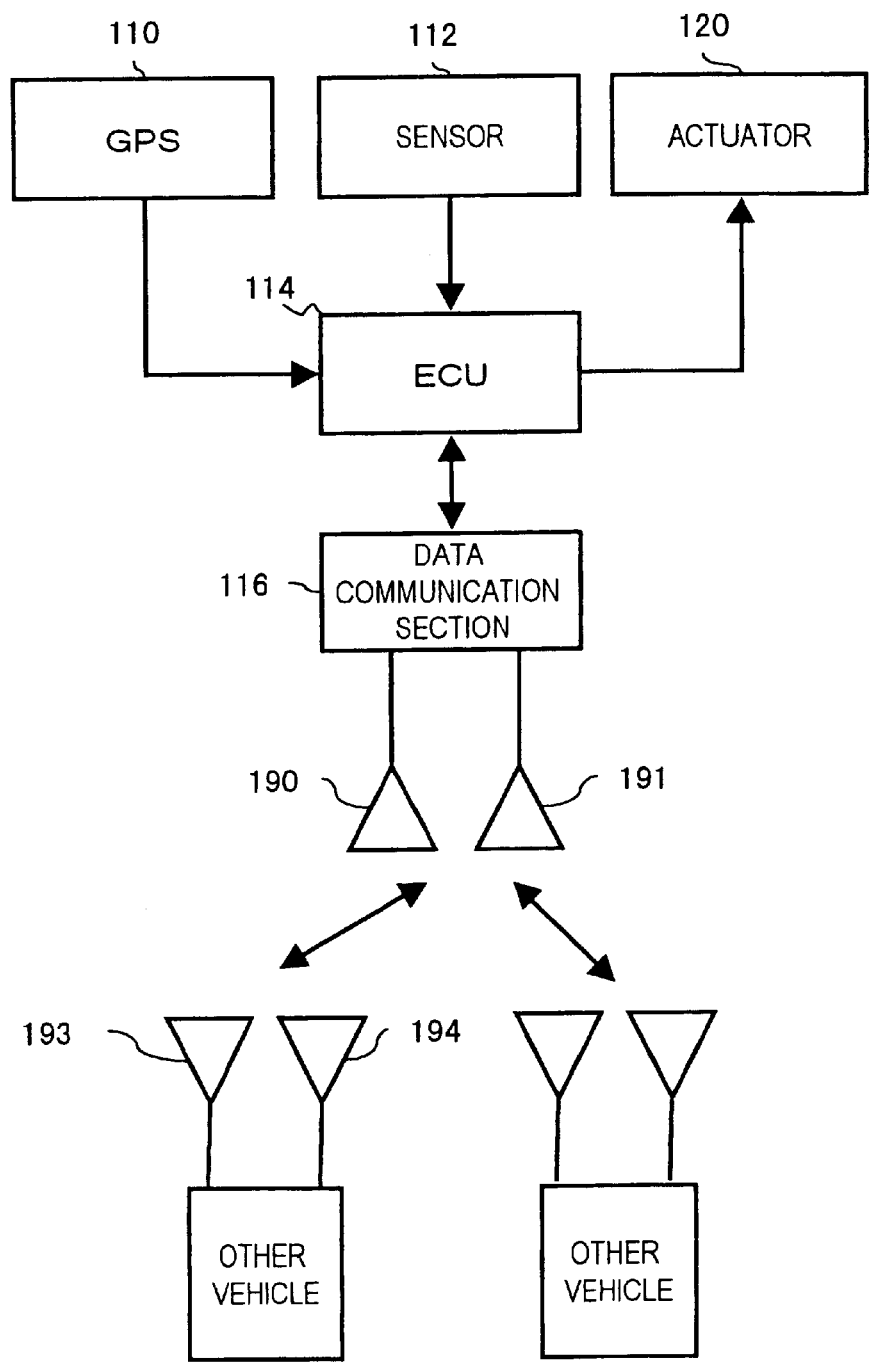
FIG. 22 is a block diagram showing the system structure of a vehicle crash avoidance control apparatus according to a fourth embodiment of the present invention.

FIG. 22 shows a block diagram of the system structure of a vehicle crash avoidance control apparatus according to a fourth embodiment of the present invention. In addition to the structure illustrated in FIG. 15, one additional antenna is added so that the user's vehicle is equipped with two antennas 190 and 191. A pulse is omnidirectionally transmitted from the antenna 190 in unspecified directions. A pulse having the same phase with that of the antenna 190 is omnidirectionally transmitted from the antenna 191 in unspecified directions. Further, another vehicle is also equipped with two antennas 193 and 194. As similar to the antennas 190 and 191, pulses having the same phase are omnidirectionally transmitted from the antennas 193 and 194 in unspecified directions.

The pulses having the same phase transmitted from the antennas 193 and 194 of another vehicle are received by the antennas 190 and 191 of the user's vehicle. A phase difference is generated in the pulses of another vehicle received by the antennas 190 and 191 of the user's vehicle in accordance with a distance between the user's vehicle and another vehicle. From this phase difference, a relative distance of the user's vehicle and another vehicle can be calculated. A calculation method is described below.

Figure 23:
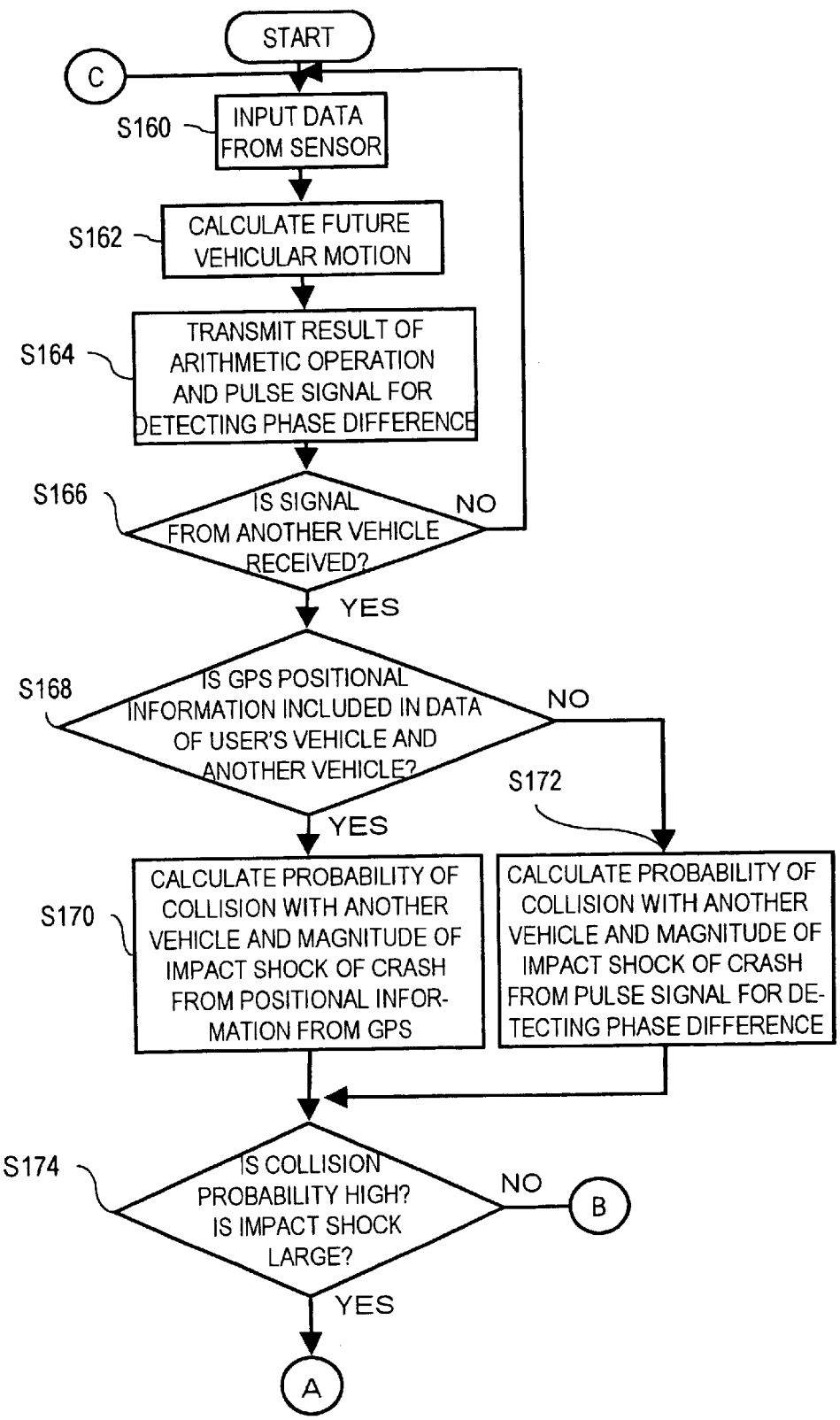
FIG. 23 is a flowchart showing a former part of the vehicle crash avoidance control processing according to the fourth embodiment of the present invention.

FIG. 23 shows a flowchart of the control processing by the vehicle crash avoidance control apparatus having the system structure illustrated in FIG. 22. Data is first input from each sensor of the user's vehicle (S160). The processing of S160 is the same with that of S110 depicted in FIG. 16.

The arithmetic operation for obtaining the future motion of the user's vehicle is then carried out (S162). In this example, although the arithmetic operation for obtaining the future motion of the user's vehicle is similar to that of S112 in FIG. 16 described above, the simulation is performed by using only the data indicative of the motion of the user's vehicle without using the positional data of GPS in order to calculate the position coordinates of the four corners of the user's vehicle from the present to a few seconds later and the spatiotemporal existence probability of the user's vehicle. These position coordinates of the four corners of the user's vehicle are not the absolute coordinates because the positional data from the GPS is not used.

Next, a result of the arithmetic operation and a pulse signal for detecting a phase difference are transmitted (S164). At this point, if the positional data of the user's vehicle from the GPS has already been received, the positional data is transmitted together with the result of the arithmetic operation and the pulse signal for detecting a phase difference. If no positional data from the GPS has been received, only the result of the arithmetic operation and the pulse signal for detecting a phase difference are transmitted.

Subsequently, a judgment is made as to whether the pulse signal from another vehicle has been received (S166). If NO, the control returns to the processing of S160. If YES, a judgment is made as to whether the data of the user's vehicle and another vehicle includes the positional data from the GPS (S168).

If YES in the processing of S168, the probability of a crash with another vehicle and the magnitude of the impact shock at the time of a collision are calculated from the positional data of GPS (S170). Here, the absolute position of another vehicle and the user's vehicle is apparent from the positional data of the GPS and, as similar to the processing of S120 shown in FIG. 16, the magnitude of the impact shock of a collision is calculated based on a position of a collision predicted from the position coordinates of the four corners and the existence probability of the user's vehicle and another vehicle and on the relative velocity at the time of a collision.

If a NO is decided at S168, either the user's vehicle or the other vehicle can not receive the electric wave from the GPS. In this case, the absolute position of the user's vehicle and the other vehicle can not be recognized. In this embodiment, the relative position of the user's vehicle and the other vehicle is obtained from a phase difference of the pulses received by the two antennas in place of the positional data of GPS to calculate the crash probability and the magnitude of the impact shock at the time of a collision (S172).

Figure 24:
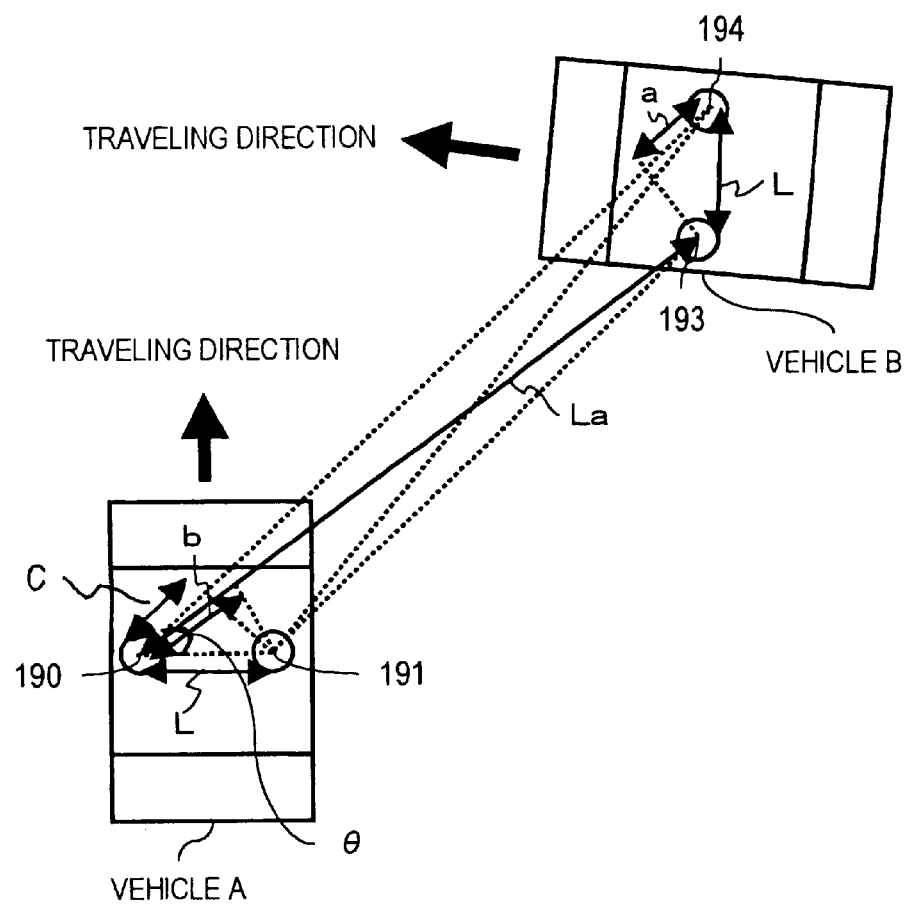
FIG. 24 is a view showing the position of the vehicle relative to that of another vehicle.

FIG. 24 shows a method for calculating the relative position of the user's vehicle A and another vehicle B. In this embodiment, it is assumed that the antennas 190 and 191 of the vehicle A are provided with an interval L therebetween and the antennas 193 and 194 of the vehicle B are provided with the same interval L therebetween. The pulse transmitted from the antenna 194 of the vehicle B is received by the antennas 190 and 191 of the vehicle A with a phase difference corresponding to a distance c. The pulse transmitted from the antenna 193 of the vehicle B is received by the antennas 190 and 191 of the user's vehicle A with a phase difference corresponding to a distance b. The pulses having the same phase transmitted from the antennas 193 and 194 of the vehicle B are received by the antenna 190 of the vehicle A with a phase difference corresponding to a distance a. In this manner, the distances a, b and c can be calculated from the phase difference in pulse of the vehicles A and B.

Here, assuming that a distance between the antenna 190 and the antenna 193 is La and an angle at which the vehicle B is viewed from the vehicle A is $\theta$ (an angle between a line segment connecting the antenna 190 to the antenna 191 and another line segment connecting the antenna 190 to the antenna 194), they can be expressed by the following formulas:

$$La = L \cdot \sin(\arccos(a/1))/(\tan(\arccos(c/1) - \arccos(b/a)))$$

$$\theta = \arccos(c/1)$$

The relative distance La between the vehicles A and B and the angle $\theta$ at which the vehicle B is viewed from the vehicle A can be calculated in this manner, thereby recognizing the relative position between the vehicles. When the relative position is obtained, the crash probability can be calculated based on the positional data and the existence probability of the user's vehicle calculated in S102.

A judgment is then made as to whether the crash probability is high and as to whether the crash impact shock is large (S174), after which the crash avoidance operation is performed if necessary.

As described above, in this embodiment, the relative position of another vehicle calculated based on the pulses transmitted/received by the antennas mounted in the vehicle can be used to calculate the probability of scrape, thereby enabling the crash avoidance control.

As mentioned above, in the third and fourth embodiments, the positional data relating to the positions and the spatiotemporal existence probability data are transmitted/received between the user's vehicle and another vehicle by the inter-vehicle communication means in the vehicle crash avoidance control apparatus, and the spatiotemporal position at which a collision occurs is calculated based on these data.

Accordingly, accurate motion information of another vehicle can be obtained to carry out more accurate avoidance control.

Fifth Embodiment

Figure 25:
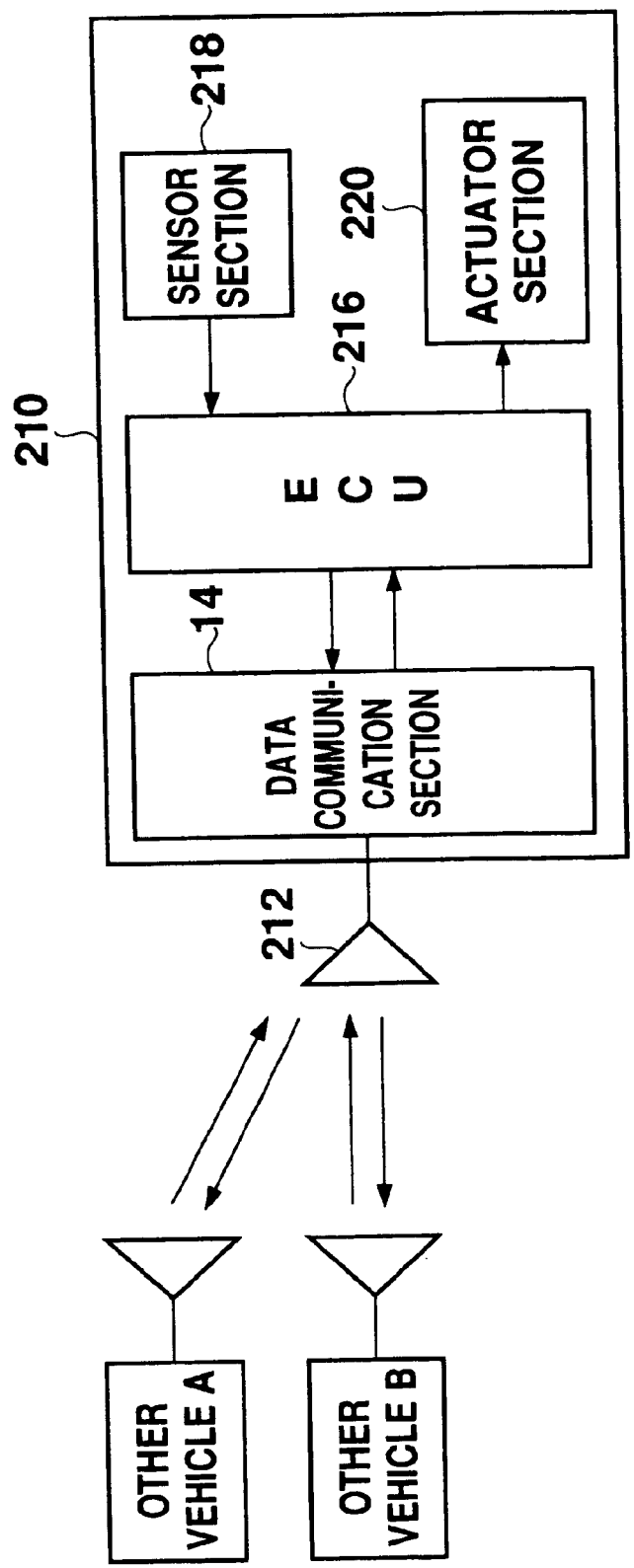
FIG. 25 is a block diagram of the structure according to a fifth embodiment of the present invention.

FIG. 25 illustrates a block diagram of the structure according to a fifth preferred embodiment of the present invention. The user's vehicle 210 and other vehicles A and B perform inter-vehicle communication and transmit/receive their traveling data.

The user's vehicle 210 is equipped with a communication antenna 212 as well as a data communication section 214, an electronic control unit ECU 216, various sensor sections 218 and an actuator section 220.

After modulating the traveling data of the user's vehicle 210, or more concretely, a predicted position, a predicted speed, and a predicted acceleration after a predetermined time calculated based on the current position, a steering angle and a speed of the user's vehicle, the data communication section 214 transmits the data to other vehicles through the antenna 212 and receives the traveling data transmitted from other vehicles so that the section 214 supplies the data to the ECU 216 after demodulation. The specific structure of the data communication section 214 will be described later.

Specifically, the ECU 26 is a microcomputer which calculates a predicted position, a predicted speed, and a predicted acceleration of the vehicle after a predetermined time as described above and also evaluates the possibility of a collision between the user's vehicle and another vehicle based on a predicted position, a predicted speed and a predicted acceleration of another vehicle which are received from that vehicle. When it is determined as a result of this evaluation that there is a possibility of a collision, a priority of the user's vehicle and another vehicle is further determined, and a control signal is supplied to the actuator section 220 based on the priority to execute the avoidance traveling of the user's vehicle. When executing the avoidance traveling, the basic principle is not to perform the avoidance operation such as deceleration without variation if there is a possibility of collision, but rather to effect the avoidance operation of the user's vehicle if comparison of the priority of the user's vehicle with that of another vehicle reveals that the priority of the user's vehicle is low or not to effect the avoidance operation if the priority of the user's vehicle is high (or to restrictively perform the avoidance operation (for example, simply sounding a horn) even if that operation is carried out and another vehicle takes charge of the primary avoidance operation).

The sensor section 218 includes a GPS, a steering angle sensor, and a speed sensor and supplies the detected current position, the steering angle and the speed of the vehicle to the ECU 216.

The actuator section 220 comprises a brake actuator, a steering actuator, a buzzer, and other such components and effects the avoidance operation such as deceleration by braking, steering, or prompting a driver to perform these operations in accordance with the control signal from the ECU 216.

Figure 26:
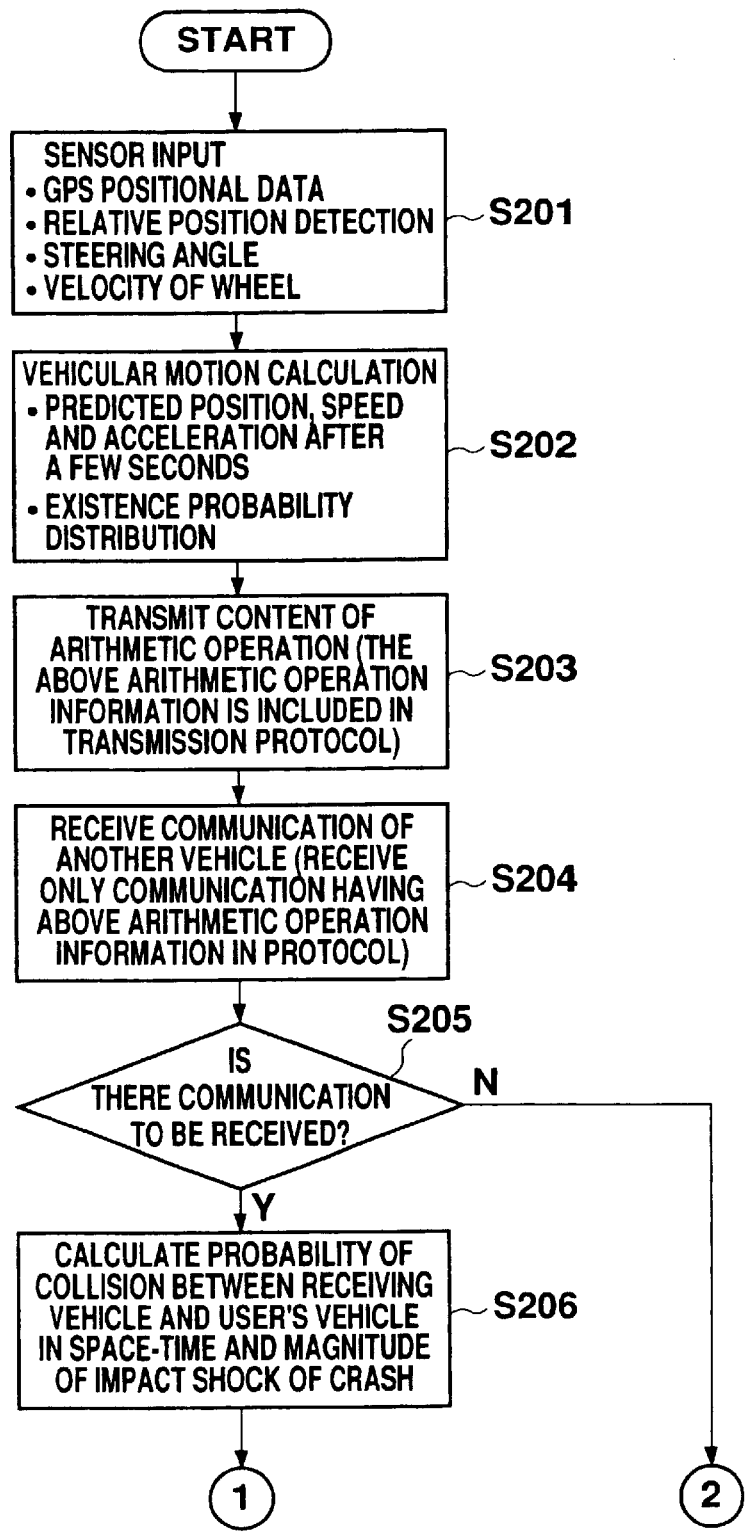
FIG. 26 is a flowchart of the entire processing (part 1) according to the fifth embodiment.

FIG. 26 illustrates a flowchart of the entire processing of this embodiment. First, a signal is input from the sensor section 218 to the ECU 216 (S201). Specifically, the input signal includes the positional data by the GPS, the steering angle and the vehicle speed. A relative position with respect to another vehicle obtained by a radar mounted in the vehicle, a yaw rate, a driving torque estimate, a road surface $\mu$ estimate, a road surface cant, a slope estimate, an estimated weight of a vehicle, or the like may also be input. Upon obtaining this data, the ECU 216 calculates the traveling data of the user's vehicle (S202). A predicted position, a predicted speed, and a predicted acceleration of the user's vehicle are calculated after a predetermined time, typically, a few seconds. In an example using predicted position, the ECU 216 effects the sequential simulation from the four-wheeled vehicle model and calculates the position coordinates of the four corners in space-time (a space axis and a time axis) from the present time to a few seconds later. A positional error due to the state of the electric wave of the GPS and the positional error due to irregularity in the vehicular characteristics are added to the position coordinates. Taking into account error, the predicted position can be expressed in the form of the probability (existence probability distribution).

The calculated traveling data is then periodically transmitted to the other vehicle (S203). As a transmission procedure, the traveling data obtained by the arithmetic operation is divided in accordance with the time and the positional data. The example is as shown in Table 5.

TABLE 5

| Time | Position | Probability of Existence |
|---|---|---|
| 1.01 | (1012.6, 104.6, 15.2) | 1.0 |
| 2.21 | (1010.3, 105.2, 15.2) | 0.95 |
| 3.35 | (1008.3, 107.2, 15.2) | 0.88 |

The time and the positional data are rounded off to appropriate units (the least significant bit LSB is rounded off) and combined to create a series of sequence of numbers. The produced sequence of numbers is randomized by a predetermined encoding process. For example, the time and the position at the time 1.01 in the Table 5 are converted as follows:

1.0, 1013, 0105, 15

→101013010515

→730184621803869

The thus-created sequences of numbers are used as random numbers for determining the PN series for the spread spectrum communication or the pattern of the hopping frequency.

It is to be noted that only the current position coordinates of the user's vehicle are used to produce the PN series or the hopping frequency. However, since a plurality of vehicles may possibly exist in the different LSBs when rounding off the position coordinates, a sequence of numbers corresponding to a vehicle ID is added to the counterpart of the positional information in order to prevent interference so that the PN series or the pattern of the hopping frequency is determined. For example, if the ID of the user's vehicle is 0323 and its current position is (1012.0, 1411.0, 15.0), the following sequences of numbers can be obtained:

0323, 1012.0, 1411.0, 15.0
→0.231012141115
→846120973956829

The actual transmission information includes an accurate time, the positional information, and the existence probability at that position, and these are converted into pulses to be carried in digital communication.

Figure 28:
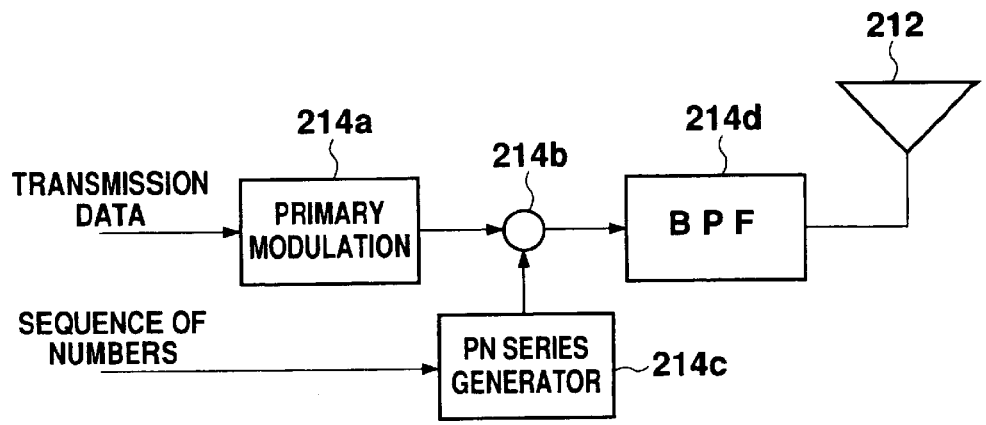
FIG. 28 is a view showing the transmission structure of a data communication section according to the fifth embodiment.

FIG. 28 illustrates a transmission structure of the data communication section 214 in an example employing spread spectrum communication. The chip time (the wavelength) of the carrier wave having a frequency which is much higher than that of the pulse transmitted by a primary modulating section 214a is changed and the modulation signal and the PN series generated in a PN series generator 214c are multiplied by a multiplier 214b so that a result of multiplication is transmitted from an antenna 212 through a band-pass filter 214d. It is to be noted that the frequency is subjected to hopping to create a carrier wave in accordance with sequences of numbers in case of the frequency hopping. Further, the transmission data may include the current position or the speed of the user's vehicle.

After transmitting the traveling data of the user's vehicle to another vehicle, the traveling data transmitted from the other vehicle is received (S204). When receiving, the electric wave transmitted by the user's vehicle is filtered or temporally removed, and the spatiotemporal proximate data is added to the data obtained by rounding off the time and the positional data of the user's vehicle generated at the time of transmission according to need to produce the random numbers as similar to transmission. For example, as the data for transmission, combination and encoding of the time 1.0 and the position (1013, 0105, 15) can obtain a sequence of numbers 730184621803869; the time 1.0 and the position (1014, 0105, 15) which are the spatiotemporal proximate data are used to produce a sequence of numbers 530144621893867; and the time 1.5 and the position (1013, 0105, 15) are used to generate a sequence of numbers 730884621893865. The produced sequence of numbers are used as random numbers for determining the PN series for the spread spectrum or the pattern of the hopping frequency and received.

Figure 29:
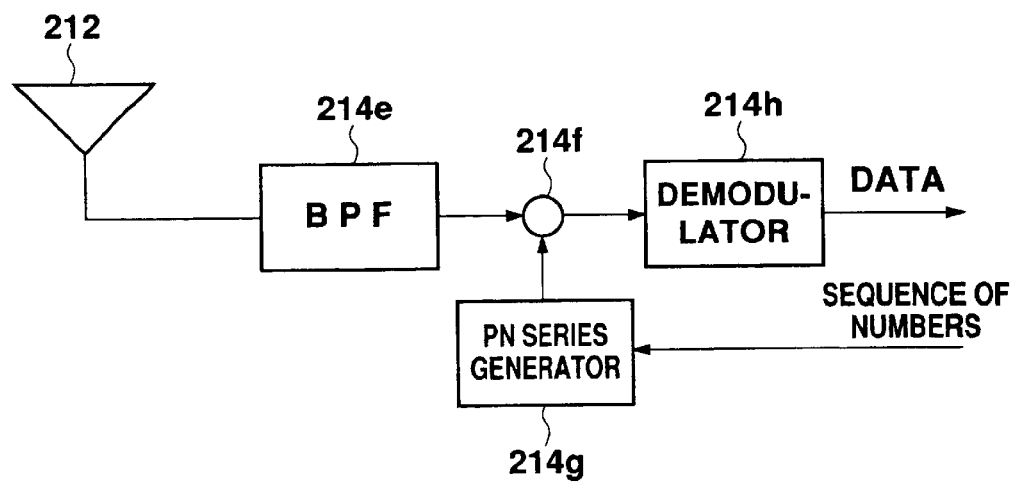
FIG. 29 is a view showing the reception structure of the data communication section according to the fifth embodiment.

FIG. 29 shows the reception structure of the data communication section 214 in an example of spread spectrum communication. The signal received by the antenna 212 is transmitted through a band-pass filter 214e, and the reception signal and the sequence of numbers are multiplied by a multiplier 214f to release the PN so that the processed signal is demodulated by a demodulator 214h. When the PN series is generate by using the vehicle ID at the time of transmission, it is needless to say that the vehicle ID is similarly used to create the PN series in reception.

Upon receiving the traveling data of the other vehicle (YES in S205) as mentioned above, the probability of a collision or scrape involving the user's vehicle and the other vehicle whose data has been received in the space-time and the magnitude of impact shock of a collision (scrape) are calculated (S206).

Figure 33:
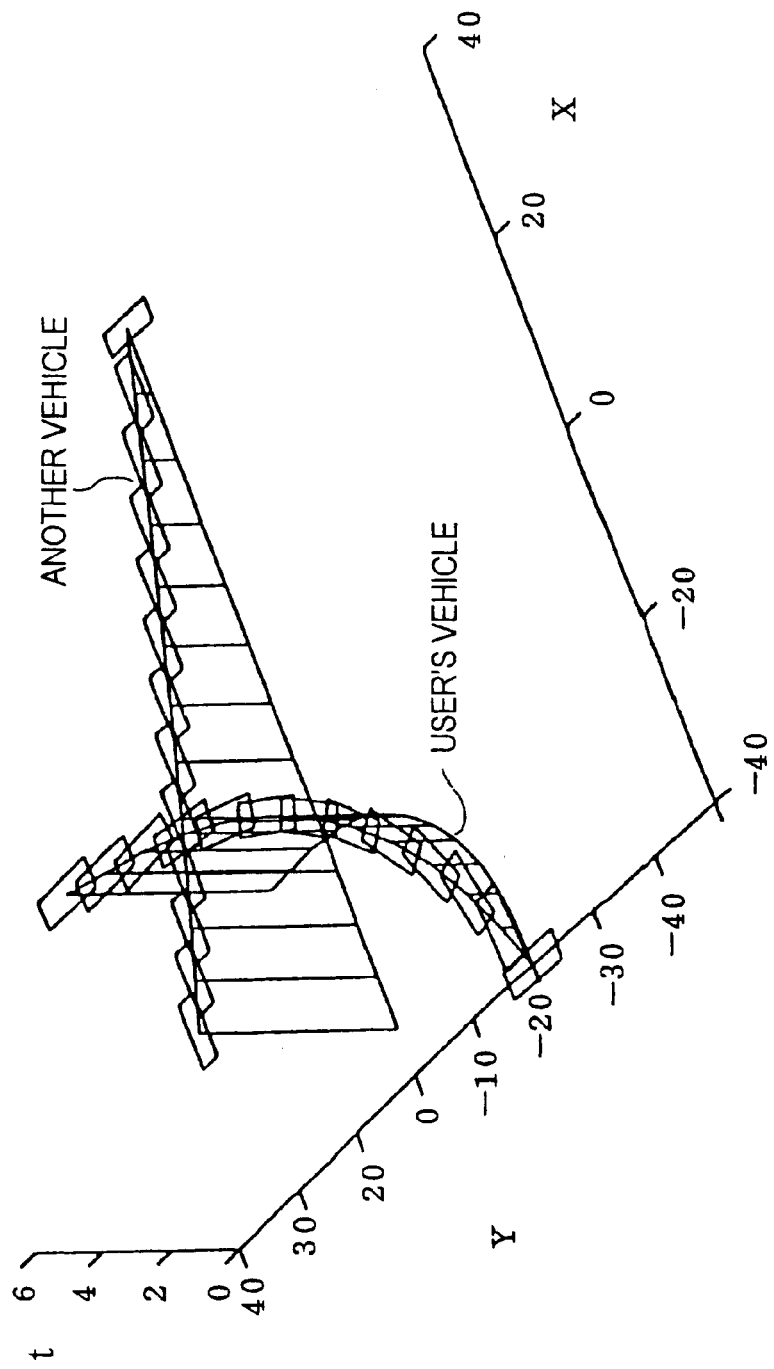
FIG. 33 is an explanatory drawing of predicted trajectories in a space-time of one's vehicle and another vehicle according to the fifth embodiment.

FIG. 33 illustrate an example of the spatiotemporal positional relationship between the user's vehicle and the other vehicle whose data has been received. In the drawing, the coordinates are space coordinates X and Y and the time coordinate t. The drawing shows a trajectory of a predicted position in the space-time of the user's vehicle and a trajectory of a predicted position in the space-time of another vehicle. An error is included in each predicted position as described above and the existence probability is provided for each position. If the predicted positions of the user's vehicle and another vehicle overlap each other at a portion corresponding to the existence probability 100%, the crash probability is 100%. If they overlap each other at a portion corresponding to the existence probability 0% to 100%, a maximum value of a product of the existence probabilities at the overlap portion becomes the crash probability. For example, a portion where the existence probability of the user's vehicle is 60% overlaps on a portion where the existence probability of another vehicle is 50%, the probability of a crash becomes 60%×50%=30%.

Meanwhile, since the magnitude of impact shock of a collision is proportionate to the motion energy, the relative velocity of the user's vehicle and another vehicle at a position where a finite (not 0) crash probability is first generated is calculated, and a square of an absolute value of the obtained relative velocity is multiplied by a predetermined constant to derive the magnitude of the impact shock.

After evaluating the probability of collision and the magnitude of the impact shock, the ECU 216 makes a judgment as to whether the probability of collision is higher than a predetermined value and the magnitude of impact shock is greater than a predetermined value (S207). If the probability of collision is determined to be high and the magnitude of impact shock is large, it is decided that the avoidance operation is necessary to execute a predetermined optimum avoidance control arithmetic operation (S208).

Figure 30:
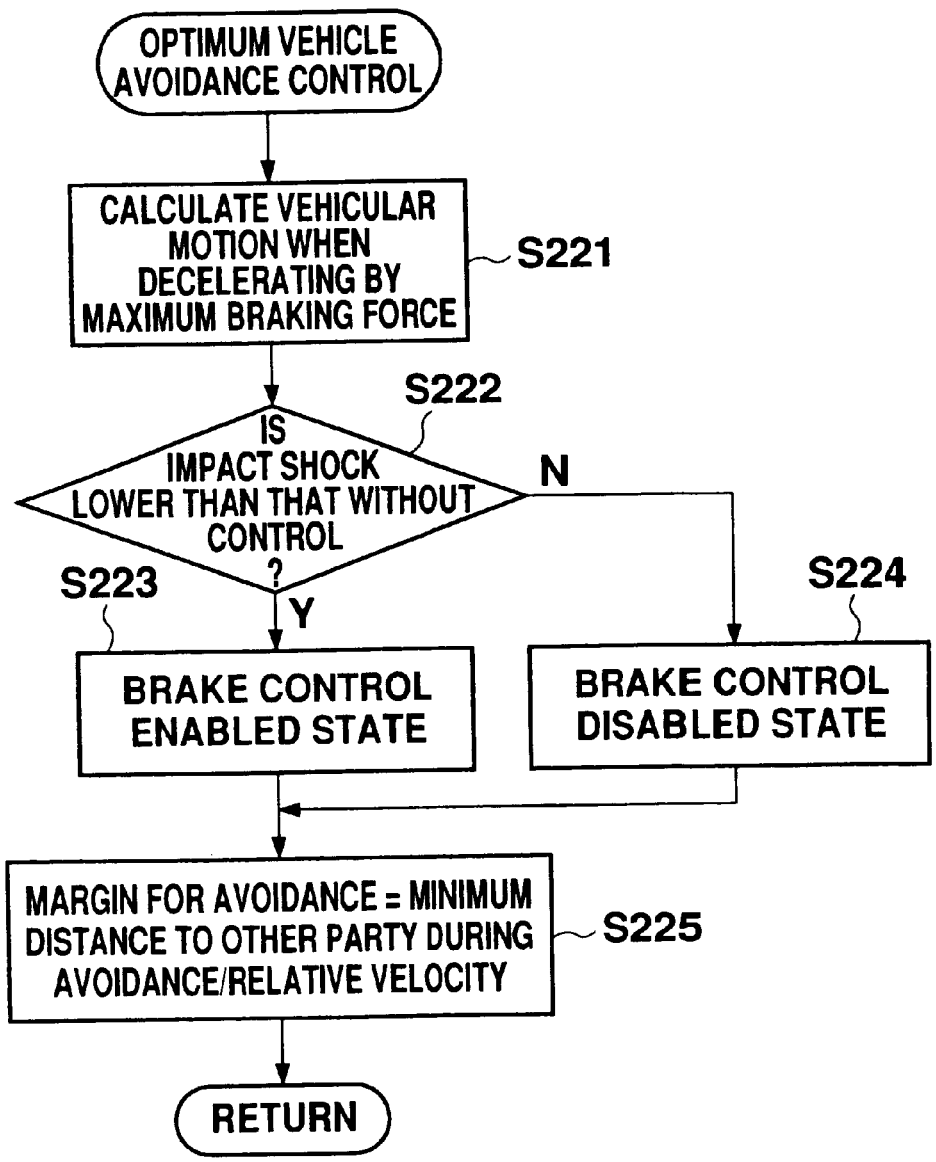
FIG. 30 is a detailed flowchart of the optimum vehicle avoidance control according to the fifth embodiment.

This optimum avoidance control arithmetic operation judges on whether the deceleration control is appropriate and calculates a margin for the avoidance, and its detailed flowchart is shown in FIG. 30.

In FIG. 30, the vehicular motion (a predicted position, a predicted acceleration and a predicted acceleration) on the assumption that the user's vehicle has decelerated by the maximum braking force is calculated (S221). Then, the calculated amount of vehicular motion is used to again evaluate the probability of collision with another vehicle and the magnitude of impact shock of collision, and a judgment is made as to whether the magnitude of the impact shock on the assumption that the user's vehicle has decelerated by the maximum braking force (assumption that another vehicular runs without deceleration as predicted) is lower than the magnitude of the impact shock in case of no deceleration by the maximum braking force (the magnitude of the impact shock calculated in S206) (S222). If the magnitude of the impact shock is lowered (including the case of no crash), it is determined that the brake control is effective to set the brake control to the enabled state (for example, the brake control flag B is set to 1: S223). Meanwhile, if the magnitude of the impact shock is not lowered (if the magnitude is unchanged or becomes large due to braking), it is determined that the brake control is not effective to set the brake control to the disabled state (the flag B is set to 0) (S224). The margin for avoidance is calculated based on the minimum distance relative to another vehicle at the time of avoidance (the minimum distance relative to another vehicle when the existence probabilities are all 100% with errors in the predicted positions of the user's vehicle and another vehicle included in the calculation) and the relative velocity of the user's vehicle and another vehicle (the current relative velocity) (S225). Specifically, the margin for avoidance is calculated by the following expression:

$$\text{Margin for Avoidance} = \text{Minimum Distance}/\text{Relative Velocity}$$

This equation is based on the fact that the larger the minimum distance is the greater the margin is and the both vehicles approaches each other slowly and thus have the margin as the relative velocity of the user's vehicle and another vehicle is small. Incidentally, since the steering operation is effected to avert a collision when the brake control is in disabled state, the margin for avoidance can be calculated with the minimum distance obtained when the appropriate steering operation is carried out.

Figure 27:
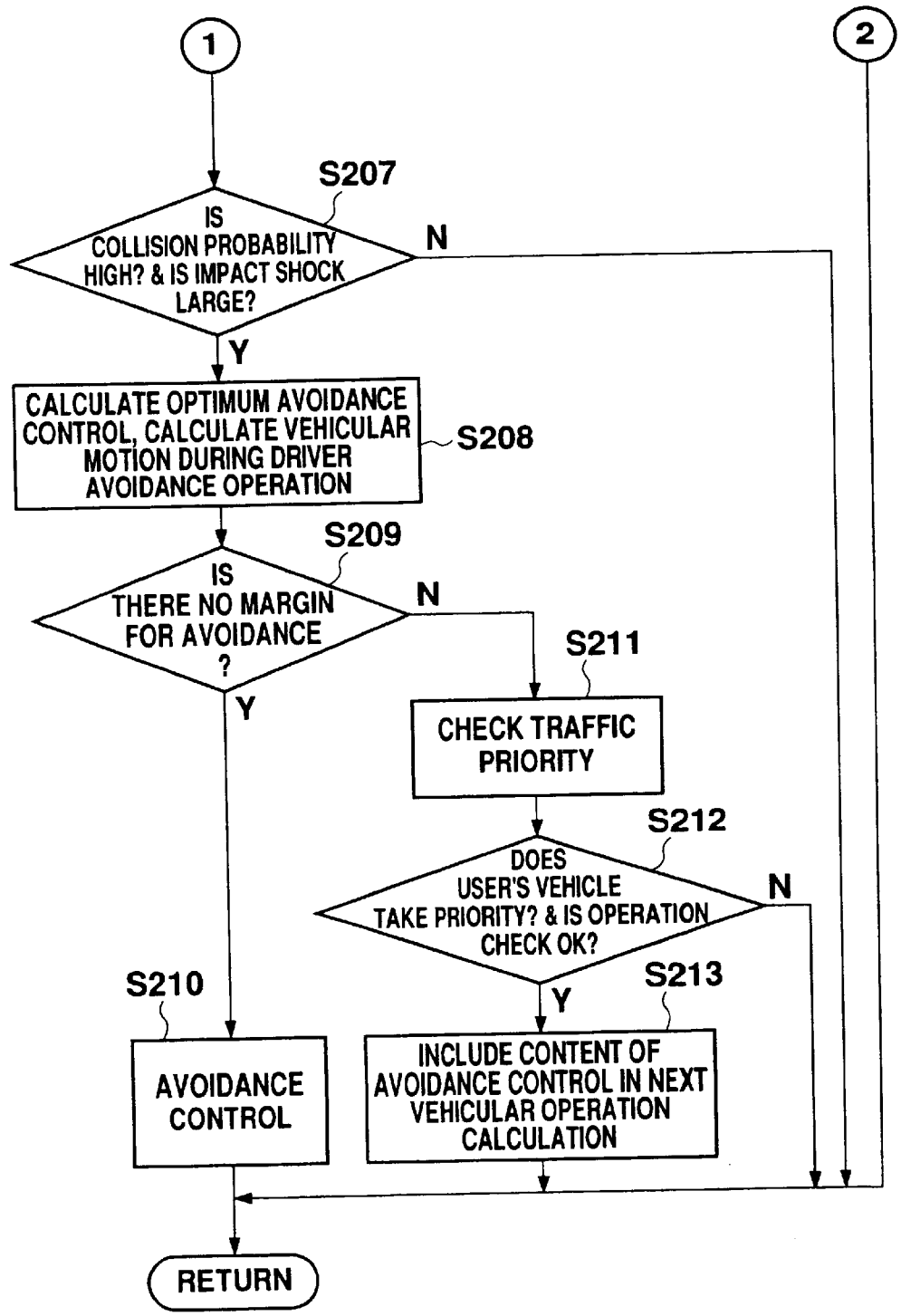
FIG. 27 is a flowchart of the entire processing (part 2) according to the fifth embodiment.

Again referring to FIG. 27, after executing the optimum avoidance control arithmetic operation as mentioned above, a judgment is made as to whether a driver has additional time before the avoidance by using the calculated margin for avoidance (S209). If the margin for avoidance is not less than a predetermined value and the driver has additional time to avoid a collision (NO in S209), the traffic priority of the user's vehicle and another vehicle is examined in order to perform further effective avoidance (S211).

Figure 31:
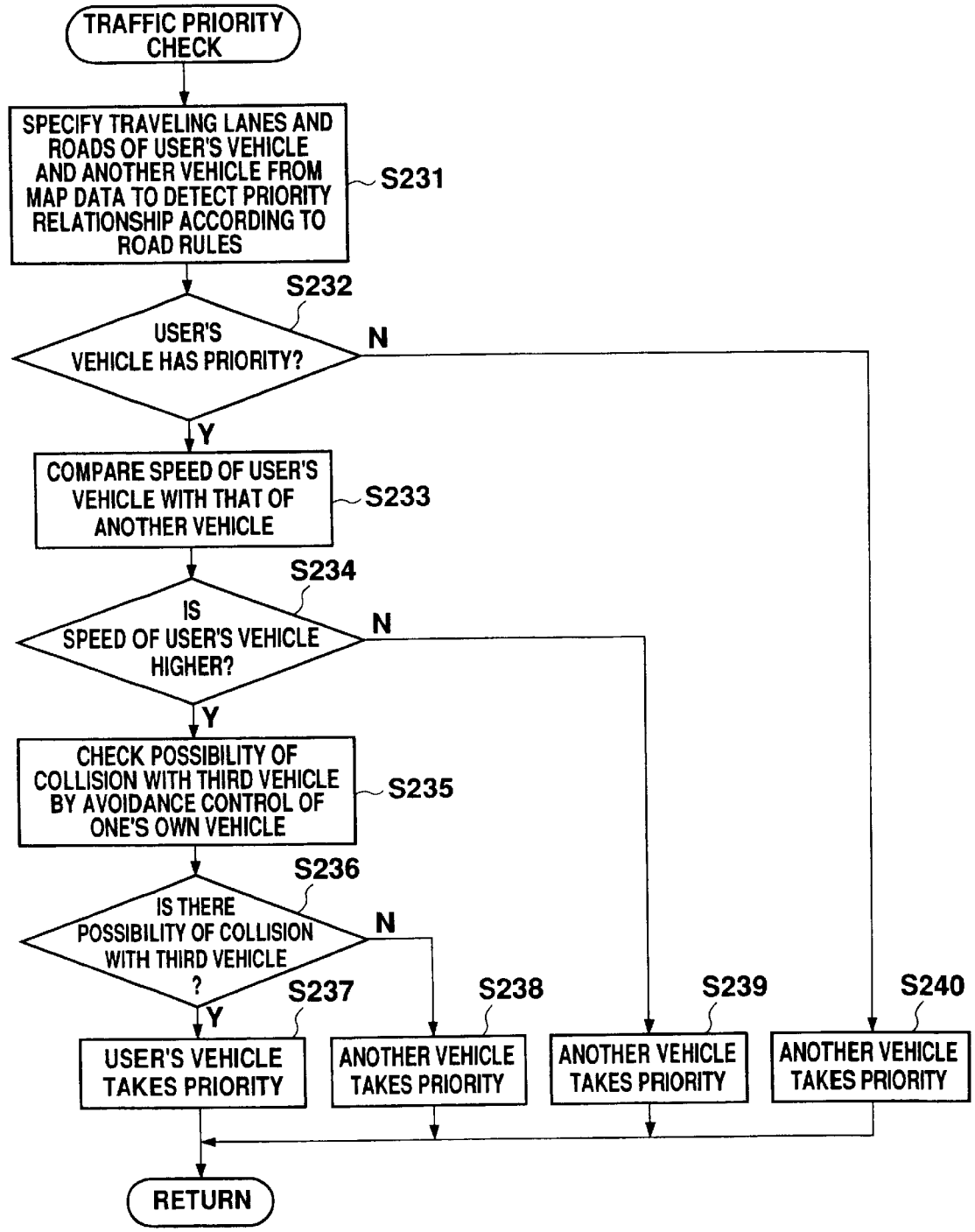
FIG. 31 is a detailed flowchart of the traffic priority check according to the fifth embodiment.

FIG. 31 illustrates the detail of the processing in S211. Cruising lanes and roads of the user's vehicle and another vehicle are first specified based on map data stored in a memory (not shown in FIG. 25: the map data of a navigation system can be used), the detected position of the user's vehicle and the received position of another vehicle to detect a priority relationship between the user's vehicle and another vehicle in accordance with road rules (S231). A judgment is made as to whether the user's vehicle takes priority (S232) and, if the user's vehicle does not take priority, a priority flag for another vehicle is set (for example, a flag P is set to 1: S230). If the user's vehicle takes priority in accordance with road rules, the current traveling speeds of the user's vehicle and another vehicle are compared with each other (S233). If a result of comparison reveals that the speed of another vehicle is higher, the priority flag for another vehicle is set (S239). The priority is given to the vehicle having the higher speed because it can be considered that execution of the avoidance operation by the vehicle having the higher speed is generally difficult and largely affects the traffic flow.

On the other hand, if the user's vehicle have the speed higher than that of another vehicle, a judgment is then made as to whether there is a possibility of collision with a third vehicle (any vehicle other than another vehicle which is determined to have a possibility of a collision in S207) by the avoidance control of the user's vehicle (S236). This judgment is enabled by, for example, existence or absence of a vehicle following the user's vehicle and existence or absence of any vehicle traveling in a lane adjacent to that of the user's vehicle (existence of these vehicles can be detected by the inter-vehicle communication or a radar apparatus mounted in the user's vehicle); the priority is given to another vehicle if there is no possibility of a collision with the third vehicle (S238); and the same is given to the user's vehicle if there is a possibility of collision with the third vehicle (S237). The user's vehicle executes the avoidance operation if "another vehicle takes priority", whilst the user's vehicle does not execute the avoidance operation if "the user's vehicle takes priority."

Again referring to FIG. 27, upon completion of examination of the traffic priority, a judgment is made as to whether the user's vehicle takes no priority (another vehicle takes priority) and the actuator section 20 malfunctions (S212). If the user's vehicle takes priority and the actuator section normally operates, the user's vehicle must perform the avoidance operation, and hence the content of the avoidance control is included in the next vehicular motion arithmetic operation to be transmitted to another vehicle (S213). Since this enables another vehicle to receive the data representing that the user's vehicle effects the avoidance operation in the next reception, another vehicle does not carry out the avoidance operation. Incidentally, although the ECU 216 of another vehicle individually makes the similar judgment to decide that that vehicle takes priority, that vehicle decides not to execute the avoidance operation upon receiving the data indicating that the other party's vehicle effects the avoidance control and determines that the priority is assigned to that vehicle rather than the other party's vehicle. However, when the data indicating that the other party's vehicle carries out the avoidance operation is not received, that vehicle executes the avoidance operation in terms of the fail safe. After the user's vehicle transmits the data representing that the user's vehicle executes the avoidance operation to another vehicle, when it is determined that there is no additional time to avert a collision in the next judging processing (YES in S209), the ECU 216 of the user's vehicle performs a predetermined avoidance control (S210).

On the other hand, if YES in S209, if there is no additional time to avert a collision, the avoidance control is immediately carried out (S210).

Figure 32:
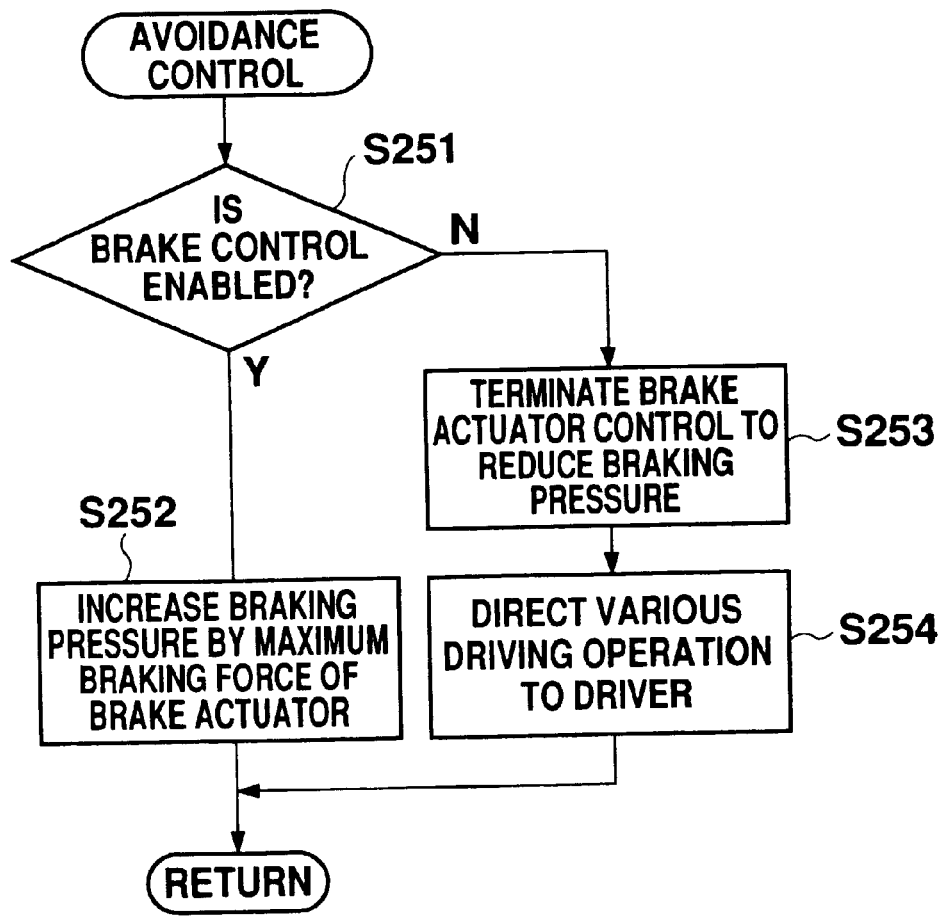
FIG. 32 is a detailed flowchart of the avoidance control according to the fifth embodiment.

FIG. 32 shows the detailed processing in S210. A judgment is made as to whether the brake control is enabled by checking a value of a brake control flag B (S251). When the brake control is enabled, the braking pressure is increased for deceleration so as to operate the brake actuator by the maximum control force (S252). This prevents a collision with another vehicle (or suppresses the impact shock of a collision). Further, when the brake control is disabled, the brake actuator control is terminated to reduce the braking pressure (S253). A driver is then directed to carry out the steering operation and the like (S404). A direction of steering is a direction for lowering the probability of a collision obtained in S206 and the impact shock.

As described above, in this embodiment, the possibility of a collision between the user's vehicle and another vehicle is evaluated, and neither the user's vehicle nor the other vehicle perform the avoidance operation, even when there is a possibility of a collision but either carries out the avoidance operation in accordance with the priority of the user's vehicle and another vehicle, thereby effectively averting a collision without producing a possibility of another collision with a third vehicle being caused by the avoidance operation.

Although in the foregoing embodiment an example wherein the priority of the user's vehicle and another vehicle is judged and one having no priority performs the avoidance operation were described, it is also possible to evaluate the priority in other terms such as, for example, percentage (the priority of the user's vehicle is 40% while that of another vehicle is 60%) and make a decision on a proportion of the avoidance operation in accordance with this percentage (a deceleration of the user's vehicle is 60% of a maximum deceleration and a deceleration of another vehicle is 40% of a maximum deceleration). That is, it is possible to share the avoidance operation by the both the user's vehicle and another vehicle in accordance with priority rather than perform the avoidance control by either of them.

Figure 34:
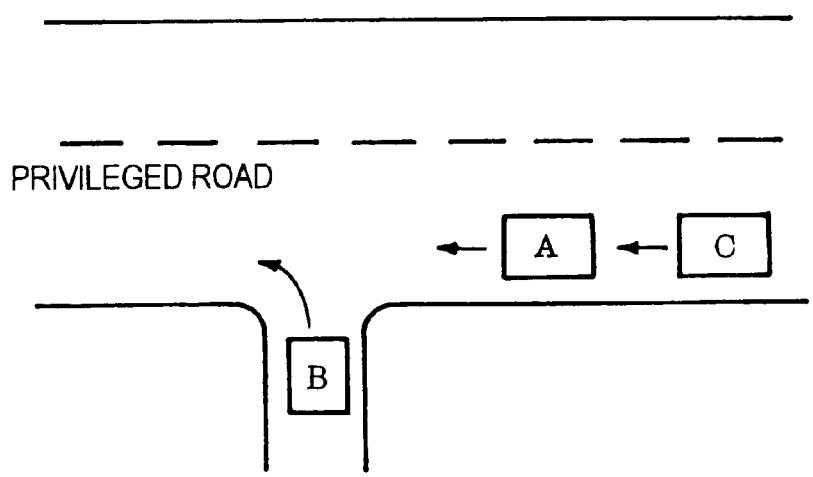
FIG. 34 is an explanatory drawing showing a positional relationship between the vehicle and another vehicle.

FIG. 34 shows a typical example of the positional relationship between vehicles A and B that have a possibility of a collision. The vehicle A travels on a privileged road while vehicle B is entering the privileged road from a non-privileged road. When it is decided that there is a possibility of a collision from the positional relationship and the traveling speeds of the two vehicles, both vehicles A and B generate a warning for their drivers and further perform the avoidance operation, such as deceleration by applying the brake.

However, since the vehicle A travels on the privileged road, the vehicle A keeps running and only the vehicle B should carry out the avoidance operation according the rules of the road, though execution of the avoidance operation such as deceleration by the vehicle A as well as the vehicle B can avert a collision between the vehicles A and B. However this results in such a problem as that a distance between the vehicle A and a vehicle C following the vehicle A is rapidly reduced (a driver of the vehicle C considers that the vehicle A does not decelerate because the vehicle A travels on the privileged road, and the driver of the vehicle C keeps traveling).

According to the fifth embodiment, it is possible to solve such a problem and effectively avert a collision while suppressing affection on the traffic flow when there is a possibility of a collision between the user's vehicle and another vehicle.

What is claimed is:

1. A vehicle crash avoidance control apparatus comprising:
   an existence probability data generating section for calculating an existence probability in current and future space-time of a first vehicle from positional data associated with a position of the first vehicle and position error data to create existence probability data;
   an inter-vehicle communication section for transmitting said positional data and said existence probability data of the first vehicle and receiving positional data associated with a position of a second vehicle and said existence probability data;
   a collision probability calculating section for calculating the probability of the first vehicle colliding with the second vehicle and for calculating a spatiotemporal position at which a potential collision will occur based on said positional data and the existence probability data of the first and second vehicles; and
   an avoidance direction sending section for directing the first vehicle to avert a collision in accordance with said crash probability and said spatiotemporal position at which the collision will occur,
   the collision probability being calculated based on a product of the existence probability of the first vehicle and the existence probability of the second vehicle.

2. A vehicle crash avoidance control apparatus as set forth in claim 1, wherein said positional data includes positional data transmitted from a GPS.

3. A vehicle crash avoidance control apparatus as set forth in claim 1, wherein said positional data includes vehicular motion data, said vehicular motion data including at least one of a turning speed, a steering angle, a vehicle speed, an acceleration, a driving torque estimate, a road surface friction coefficient estimate, a road surface cant, a slope estimate, and an estimated weight of a vehicle.

4. A vehicle crash avoidance control apparatus as set forth in claim 1, wherein said avoidance direction sending section directs the first vehicle to avert the collision additionally in accordance with the velocity of the first vehicle relative to the second vehicle at said spatiotemporal position at which a collision will occur.

5. A vehicle crash avoidance control apparatus as set forth in claim 1, wherein the existence probability data comprises distribution data of regions having different probabilities.

6. A vehicle crash avoidance control apparatus comprising;
   an inter-vehicle communication section for receiving an electric wave from another vehicle and transmitting an electric wave from the first vehicle to a second vehicle;
   an existence probability data generating section for calculating an existence probability in current and future traveling space-time of the first vehicle and the second vehicle from relative position data in current and future space-time of the first and second vehicles calculated based on said received electric wave from the second vehicle, and generating existence probability data;
   a collision probability calculating section for calculating a collision probability and a spatiotemporal position at which a collision will occur for the first and second vehicles based on said existence probability data of the vehicles; and
   an avoidance direction sending section for directing the first vehicle to avert a collision in accordance with said crash probability and said spatiotemporal position at which a collision will occur,
   the collision probability being calculated based on a product of the existence probability of the first vehicle and the existence probability of the second vehicle.

7. A vehicle crash avoidance control apparatus as set forth in claim 6, wherein said avoidance direction sending section directs the first vehicle to avert a collision additionally in accordance with the velocity of the first vehicle relative to the second vehicle at a spatiotemporal position at which a collision will occur.

8. A vehicle crash avoidance control apparatus as set forth in claim 6, wherein the existence probability data comprises distribution data of regions having different probabilities.

* * * * *